US010290036B1

(12) United States Patent
Gella et al.

(10) Patent No.: US 10,290,036 B1
(45) Date of Patent: May 14, 2019

(54) SMART CATEGORIZATION OF ARTWORK

(71) Applicant: Amazon Technologies, Inc., Reno, NV (US)

(72) Inventors: Ganesh Kumar Gella, Bellevue, WA (US); Christopher Pitstick, Seattle, WA (US); Pratik Prakash Shah, Seattle, WA (US); Atacan Conduroglu, Seattle, WA (US); Daniel Paul Kirschner, Seattle, WA (US); Jordan Carl Cherry, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 815 days.

(21) Appl. No.: 14/097,104

(22) Filed: Dec. 4, 2013

(51) Int. Cl.
G06Q 30/06 (2012.01)
(52) U.S. Cl.
CPC ..... G06Q 30/0623 (2013.01); G06Q 30/0621 (2013.01)
(58) Field of Classification Search
CPC .............. G06Q 30/0621; G06Q 30/0623
USPC ........................................ 705/26.5
See application file for complete search history.

(56) References Cited

U.S. PATENT DOCUMENTS

| 8,054,170 B1* | 11/2011 | Brandt | G06K 9/4676 340/453 |
| 8,391,618 B1* | 3/2013 | Chuang | G06K 9/00664 382/224 |
| 2002/0103813 A1* | 8/2002 | Frigon | G06F 17/30247 |
| 2003/0117620 A1* | 6/2003 | Balas | B44D 3/003 356/326 |
| 2003/0128877 A1* | 7/2003 | Nicponski | G06K 9/6269 382/224 |
| 2006/0087517 A1* | 4/2006 | Mojsilovic | G06T 7/408 345/593 |
| 2009/0304267 A1* | 12/2009 | Tapley | G06K 9/4652 382/156 |
| 2010/0312671 A1* | 12/2010 | Land | G06Q 10/067 705/26.1 |
| 2012/0105467 A1* | 5/2012 | Chao | G06Q 10/10 345/589 |
| 2012/0230590 A1* | 9/2012 | Zhang | H04N 1/00331 382/195 |
| 2012/0275642 A1* | 11/2012 | Aller | H04M 1/72522 382/100 |
| 2012/0317657 A1* | 12/2012 | Glimcher | G06Q 30/0603 726/29 |

(Continued)

OTHER PUBLICATIONS

Tower, Apple Team for Retail Website, May 4, 1996, Billboard, p. 72.*

(Continued)

Primary Examiner — Jason B Dunham
Assistant Examiner — Brittany E Bargeon
(74) Attorney, Agent, or Firm — Kilpatrick Townsend & Stockton LLP

(57) ABSTRACT

Techniques for obtaining information about an artwork and presenting such information may be provided. For example, a visual representation of the artwork, such as an image, may be received and analyzed. Results of the analysis may be categorized into a type and attributes of the artwork and may be presented to a first user for confirmation. Once a confirmation is received, the categorized type and attributes and other information may be presented to a second user searching for the artwork.

24 Claims, 11 Drawing Sheets

(56) References Cited

U.S. PATENT DOCUMENTS

| | | | | |
|---|---|---|---|---|
| 2013/0033522 A1* | 2/2013 | Calman | ............ | G06Q 30/0633 345/633 |
| 2013/0054613 A1* | 2/2013 | Bishop | ............. | G06F 17/30011 707/748 |
| 2013/0083999 A1* | 4/2013 | Bhardwaj | .......... | G06Q 30/0643 382/165 |
| 2013/0311868 A1* | 11/2013 | Monney | ............ | G06F 17/30017 715/230 |
| 2014/0092992 A1* | 4/2014 | Sullivan | .............. | H04N 19/172 375/240.26 |
| 2014/0122283 A1* | 5/2014 | Mehra | .............. | G06F 17/30277 705/26.1 |
| 2014/0122410 A1* | 5/2014 | Ludlow | ............... | G06N 99/005 706/59 |
| 2014/0270329 A1* | 9/2014 | Rowley | ................... | G06K 9/46 382/100 |

OTHER PUBLICATIONS

Atwood, Brett, Tower, Apple Team for Retail Website, May 4, 1996, The Nielsen Company, Billboard, 0006-2510, p. 72. (Year: 1996).*

\* cited by examiner

US 10,290,036 B1

SMART CATEGORIZATION OF ARTWORK

BACKGROUND

More and more users are turning to network-based resources, such as websites, to sell and/or purchase items. These network-based resources offer a wide range of items ever increasing in choice, variety, and quantity.

Typically, a seller of an item may operate a computing device to access a network-based resource, enter information descriptive of the item, and offer the item for sale. In turn, the network-based system may present the descriptive information to a computing device of a potential buyer, who can use the information to decide whether to purchase the item or not. To enhance the seller's and buyer's experiences, the network-based resource may implement techniques to ensure that relevant and accurate information is received from the seller and presented to the buyer. This is because, unlike a brick and mortar store that may allow the seller and buyer to engage in a physical review of the item prior to a purchase, the network-based resource may only allow a virtual review. In some situations though, such as with certain types of items, entering the descriptive information may require an involved effort on behalf of the seller.

BRIEF DESCRIPTION OF THE DRAWINGS

Various embodiments in accordance with the present disclosure will be described with reference to the drawings, in which.

DETAILED DESCRIPTION

Figure 1:
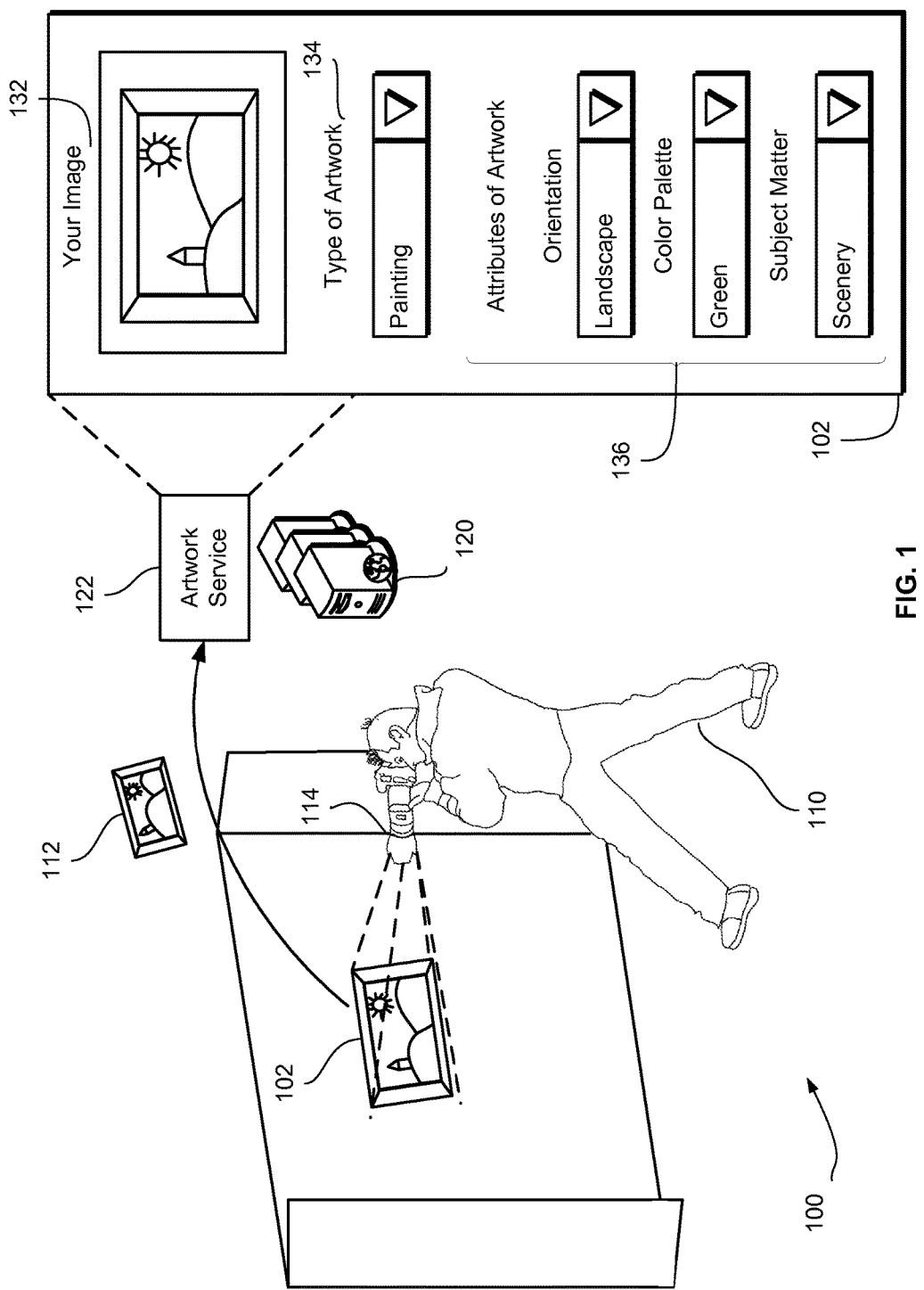
FIG. 1 illustrates an example architecture for obtaining item information from a user, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, enhancing a user's experience when conducting a transaction by way of a network-based resource. Specifically, techniques herein are directed to enhancing a seller's experience by optimizing needed effort to offer an item for sale at the network-based resource. Similarly, the techniques herein are also directed to enhancing a buyer's experience by improving the relevance and accuracy of the information about the item when presented to the buyer.

For example, Joe may want to sell an artwork such as a painting of a horse running on a green pasture and Jeanette may be looking for similar artwork. Embodiments herein may implement techniques that may allow a service provider to host a web site for selling artworks. Joe may take and upload a photo of the artwork to the web site. In turn, the web site may determine the type and may extract various attributes of the artwork from the photo. For example, the web site may determine that the artwork is a painting of a horse drawn on a green pasture.

The web site may publish the photo uploaded by Joe, the determined type, and the extracted attributes as a description of the artwork and may use any of this information when interacting with buyers. For example, Jeanette may be able to find Joe's artwork by entering at a search field of the web site a key word search of "painting of a horse on a green pasture." In turn the web site may present the description and may allow Jeanette to buy the artwork.

To enhance a user's experience, the network-based resource may implement a service that may specify, for each type of items, what attributes may be relevant to sellers and buyers. In response to receiving a visual representation (e.g., an image) of an item from a seller, the service may automatically determine a type and attributes of the item based at least in part on the visual representation and may present this information to the seller for confirmation. As such, the effort of the seller to offer the item for sale may be minimized to, for example, providing the visual representation and the confirmation.

Further, the service may allow various operations to a buyer. In one operation, the service may present the information, including the attributes to the buyer. Because the service may have automatically determined and confirmed the attributes, the accuracy and fidelity of the information presented to the buyer may increase. In a second operation, the service may allow the buyer to search for the item based at least in part on a combination of type and attributes. As such, when browsing for items, the buyer may not only find relevant items, but may also receive accurate information about each item.

Embodiments herein are described with reference to artworks. An artwork (e.g., a piece of art) may be an item that has an aesthetic value relevant to a user (e.g., a seller or a buyer). This aesthetic value may be the primary value of the item (e.g., in comparison to a functional value) and may be artistic-based. In some situations, this value may not only be subjective to the user, but may also change between multiple users. For example, two reviewers of a same painting may differ on whether that painting is aesthetically pleasing or not.

A network-based resource configured to facilitate a transaction that includes an artwork may require that a description of the artwork be accurate and relevant. Otherwise, a buyer connecting to the network-based resource to browse artworks may not be able to find the artwork or, even if found, may not be able to assess the corresponding aesthetic value. Because a picture is worth a thousand words, a seller of the artwork may be enticed to provide a visual representation of the artwork to the network-based resource. To minimize the seller's effort, improve the accuracy and relevance of the artwork description, and improve the buyer's experience, the network-based resource may implement the service described above. The service may analyze the visual representation to automatically determine a type and attributes of the artwork.

To illustrate, the service may determine that for a painting, relevant attributes may include, for example, a subject matter (e.g., nature, historic events, etc.), a color palette (e.g., primary and secondary colors), an orientation (e.g., portrait, landscape, etc.), a shape (e.g., rectangle, oval, etc.), an artist identifier (e.g., name), a frame condition (e.g., whether the artwork is offered for sale with a frame or not), a creation date (e.g., when did the artist complete the artwork), a size (e.g., actual size or a size within a range), and an age rating (e.g., whether the artwork should be marked as adult or not). This list of attributes is not exhaustive and may include additional or less attributes and may depend on the type of the artwork (e.g., a painting in this example). Instead of requiring a seller to subjectively assess a value for each attribute and to manually input a description of each value, the service may receive an image of the painting from the seller. In response, the service may automatically extract the values and populate the attributes accordingly. As needed, the service may confirm these values with the seller for subsequent presentation to a buyer. As such, in just a few clicks, the service may allow the seller to offer the painting for sale at the network-based resource with relevant and accurate information and may allow the buyer to search for the painting based at least in part on a combination of the attributes.

FIG. 1 depicts an illustrative computing environment 100 for implementing the techniques described herein. In particular, computing environment 100 may be configured to allow a seller 110 and a service provider 120 to exchange and derive information about an artwork 102. As exemplified, seller 110 may provide an image 112 of the artwork to service provider 120. In turn, service provider 120 may implement a service 122, such as the one described herein above, to analyze the image and automatically determine the type and relevant attributes of the artwork from the image. Service 122 may also allow service provider 120 to provide an interface 130 to seller 110 at which the determined type and attributes are presented for confirmation.

As illustrated in FIG. 1, seller 110 may be a person (e.g., an owner, an artist, or a creator of the artwork) or an entity (e.g., a store or a gallery) that plans to offer artwork 102 for sale using a network-based resource of service provider 120. In other words, seller 110 may be a provider of the artwork. The network-based resource may be a website or any other type of resources configured to facilitate a marketplace where artworks can be listed, purchased, and/or exchanged. Seller 110 may have an account with service provider 120 by which transactions involving the artwork can be facilitated.

Seller 110 may operate a computing device 114 to generate image 112 of the artwork. In an example, computing device 114 may be a single computing device (e.g., a personal electronic device, a computing tablet, a smartphone, a mobile device) or a combination of computing devices (e.g., a camera and a personal computer) or any other type of computing devices configured to take and transmit image 112 to service provider 120 over a network (e.g., a network that includes the Internet).

Image 112 is an example of a visual representation of artwork 102. Other visual representations may also be used. For example, in addition or in lieu of a two dimensional image, computing device 114 may generate a three dimensional representation such as a three dimensional image or a three-dimensional electronic model (e.g., a computer-aided design (CAD) file) of the artwork.

Also, a painting is an example of artwork 102. But service provider 120 may facilitate transactions involving other types of artworks. These may include multi-dimensional artworks such as two-dimensional (e.g., a painting, a poster, a photo), three-dimensional (e.g., a sculpture), four dimensional (e.g., a sculpture that may move or be associated with an audio file), or higher-dimensional works. Similarly, any of these types may be a single piece (e.g., a single framed painting) or a multi-piece artwork (e.g., a painting that includes multiple separate paintings, each of which may be framed).

Service provider 120 may receive the visual representation (e.g., image 112) from computing device 114 with or without additional information from seller 120. This additional information may include information about artwork 102, such as a short description, a price, etc., and information about seller 110, such as a date by which the seller can ship the artwork, a preferred shipping method, etc. In turn, service 122 may analyze the visual representation and, optionally, portions of the additional information, if any, to first determine a type of the artwork. Based at least in part on the type, service 122 may determine a list of attributes that may need to be collected. These attributes may be relevant to users (e.g., seller 110 or potential buyers) and may represent features or characteristics associated with an aesthetic value of the artwork. Service 122 may analyze the visual representation and, optionally, portions of the additional information to collect values of the attributes. Once collected, service 122 may automatically categorize the attributes and the respective values for presentation at interface 130. Techniques for determining and categorizing the type and the attributes are further described in the figures herein below.

Interface 130 may present various information about artwork 102 as automatically generated by service 122 to seller 110. More particularly, interface 130 may include a copy of the visual representation (shown as "your image 132" in FIG. 1), the type (shown as "type of artwork 134" in FIG. 1), and the attributes and the respective values (shown as "attributes of artwork 136" in FIG. 1). Although FIG. 1 illustrates three attributes (e.g., orientation, color palette, and subject matter), other attributes may also be used as explained herein above. The type and the attributes may be categorized in corresponding fields at user interface 130 and may be automatically populated with the corresponding values from the analysis. As such, in response to receiving the visual representation and, optionally, any additional information, service provider 120 may present prepopulated type and attributes of artwork 102 to seller 110 by way of interface 130.

In turn, seller 110 may review the presented information and provide updates accordingly. For example, to agree with the presented information, seller 110 may select and click a confirm button or any other button configured to confirm the information at interface 130. But if the seller disagrees with some of the information (e.g., the value of color palette attribute may appear erroneous to the seller), interface 130 may allow seller 110 to update this information. As shown, each of the pre-populated fields of interface 130 may be configured to provide a drop-down selection that allows seller 110 to update a field accordingly. Other types of fields may also be used, such as checkboxes or free-form fields that can accept any text input from seller 110. Further, if service 122 did not extract a value for an attribute, user interface 130 may present a blank field corresponding to that attribute. A request can be associated with the blank field to solicit input from seller 110. For example, a text next to the field may appear to indicate that input is required, the field may be highlighted with a certain color or character (e.g., an asterisk), and/or user interface 130 may not allow seller 110 to proceed with offering the artwork for sale until the blank field is filled.

Although FIG. 1 describes computing environment 100 as using a single visual representation (e.g., one image 112) to automatically categorize the type and attributes of artwork 102, a larger number of visual representations may be used. For example, service provider 120 may receive multiple images of the artwork from seller 110 and, in turn, service 122 may analyze some or all of the received images. For example, service 122 may analyze all of the images and cross-check the derived values to improve the fidelity of the analysis. To illustrate, if three images of artwork 102 were received and if service 122 determined that the color palette is primary red in two of the images and green in the third one, service 122 may declare the color palette as primary red. In another example, service 122 may analyze only the necessary number of images to determine the values. To illustrate, if service 122 determined all values but one attribute from a first image, the service 122 may analyze a second image to specifically determine that missing value. If determined, service 122 need not analyze any other images. In yet another example, if a value of an attribute could not be extracted from the received images, service 122 may instruct interface 130 to present a request for seller 110 to submit a suggested image that may be usable for extracting that value. To illustrate, if the artist could not be identified, service 122 may request seller 110 to provide an image that zooms-in on the signature of the artist in artwork 102.

Figure 2:
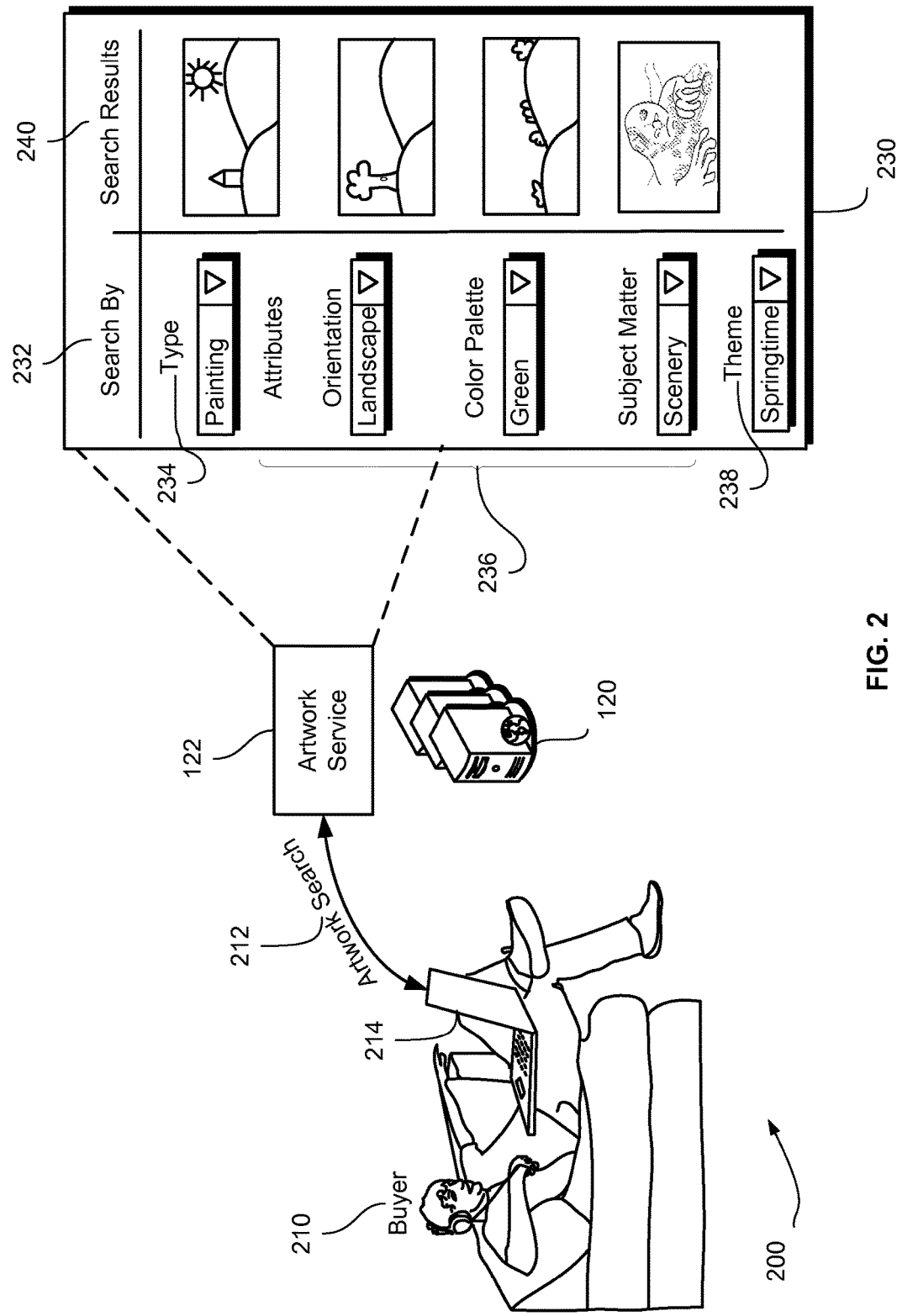
FIG. 2 illustrates an example architecture for presenting item information to a user, according to embodiments.

Once the type and attributes of artwork 102 are confirmed (e.g., agreed to, updated, and/or blank fields filled-in), service 122 may facilitate posting the artwork for sale at the network-based resource. In turn, buyers looking for artworks may browse and find artwork 102 accordingly. FIG. 2 is an example of a computing environment 200 configured to facilitate an interaction between a buyer 210 and service provider 120.

As illustrated in FIG. 2, buyer 210 may operate a computing device 214 such as a personal computer, a tablet, a smartphone or any other computing device configured to connect and submit an artwork search 212 to service provider 120 over a network (e.g., a network that includes the Internet). Buyer 210 may be a person (e.g., a head of a household, an art collector) or an entity (e.g., a business, a company) that has an account with service provider 120. The account may be configured to facilitate a transaction such as purchasing or returning artwork 102.

Further, service provider 120 may provide an interface 230 configured to present artwork information in response to artwork search 212. More particularly, service 122 may drive interface 230 to allow various types of artwork searches. For example, in addition to allowing buyer 210 to use keyword searches, interface 230 may allow the buyer to browse and search for artwork based at least in part on values associated with a combination of type and attributes. As shown in FIG. 2, artwork search 212 of buyer 210 may be presented at interface 230 as a "search by" 232 field. Under this field, buyer 210 may select values corresponding to any or all of a type 234, attribute(s) 236 (e.g., orientation, color palette, and subject matter), and a theme 238. Each of these criteria may correspond to information extracted by service 122 from previous analyses of images of artworks offered for sale.

Further theme 238 may correspond to a suggested combination of attributes or of attribute(s) and a type that may represent a theme. A theme may describe a subject such as an emotion (e.g., cheerful, sad), an ambiance (e.g., dark), a season (e.g., Fall), a holiday (e.g., Christmas), or any other subjects and may associate a combination of attribute values with that subject. For example, a combination of a primary red color, a secondary green color, a tertiary orange color, and a subject matter representative of an interior of a room may represent a Christmas theme. This may be because typical Christmas-oriented artwork may depict a room with festive red colors, a green tree, and a warm fireplace. As such, instead of requiring buyer 210 to select each attribute value of this theme, interface 230 may allow the buyer to select Christmas under theme 238 and, in turn, service 122 may use this selection to return search results of artworks that may use a primary red color, a secondary green color, a tertiary orange color, and a subject matter representative of an interior of a room.

Suggested combinations available under theme 238 may be defined by various parties. For example, service provider 120 (e.g., an employee of the service provider that has artwork expertise) may review attributes of artwork offered for sale and may specify suggested combinations based at least in part on the review. In another example, when a seller offers an artwork for sale, that seller may specify a combination of attributes associated with the artwork as a theme. To illustrate, and referring to FIG. 1, if service 122 determines that the color palette of artwork 102 is primary green and secondary white and that the subject matter is a scenery, service 122 may allow seller 110 to group these three attribute values as a suggested springtime theme. In yet another example and referring back to FIG. 2, other buyers may also define suggested combinations. For instance, a similar interface to interface 230 may have been presented to a previous buyer. That buyer may have searched and bought a springtime-oriented artwork based at least in part on an artwork search that used green as primary color, white as a secondary color, and scenery as a subject matter. In turn, service 122 may use this information about the behavior of the previous buyers to automatically combine the three attribute values as a suggested springtime theme. Additionally or alternatively, the interface of the previous buyer may allow that buyer to specifically enter and associate the springtime theme with the three attribute values.

Once buyer 210 provides artwork search 212 at interface 230 by way of computing device 214, service 122 may search artwork offered for sale to return search results 240 that best match the search. More specifically, service 122 may use the values of the selected type 234, attribute(s) 236, and/or theme 238, to seed the search and select one or more artworks that may have a same or related type, attribute, and theme values. To illustrate, if buyer 210 defines a search for a painting that is landscape oriented, has a green color palette, and represents scenery, service 122 may find and return information about artwork 102 of FIG. 1, and other paintings that have similar attribute values. This information may be presented at interface 230 under search results 240.

In turn, when buyer 210 selects any of the artworks from search result 240, service 122 may display additional information about the selected artwork. For example, service 122 may refresh interface 110 to show a description of the selected artwork, including an image, the type, all of the relevant attributes, the price, the seller, shipping information, and/or any other information available about that artwork. Further, service 122 may facilitate a transaction (e.g., a purchase) between buyer 110 and the seller of the selected artwork.

Figure 3:
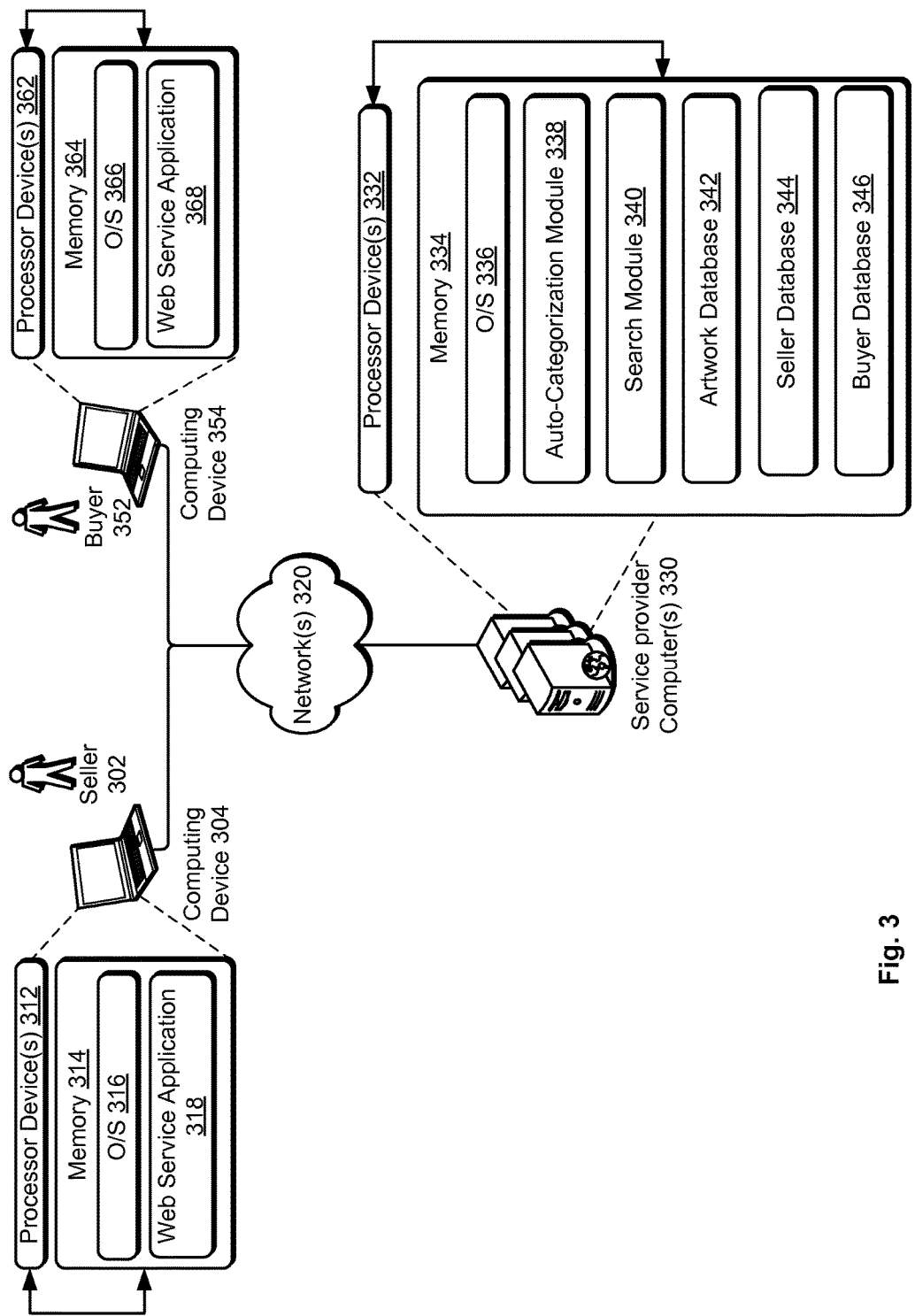
FIG. 3 illustrates an example architecture for obtaining and presenting item information, including at least one user device and/or one or more service provider computers connected via one or more networks, according to embodiments.

Turning to FIG. 3, that figure illustrates an example end-to-end computing environment 300 for obtaining artwork information from one or more sellers and for presenting artwork information to one or more buyers. In this example, a service provider (such as service provider 120 of FIGS. 1 and 2) may implement service 122 part of a network-based resource or a marketplace for facilitating artwork transactions between the one or more sellers and the one or more buyers. As described in FIG. 3, a seller can be a user that may have an account with the service provider configured to support offering and selling artwork. Similarly, a buyer can be a user that may have an account with the service provider configured to support purchasing artwork. Because a seller may also be a buyer of artwork, there may be similarities between configurations of computing devices associated with the one or more sellers and the one or more buyers. For clarity of explanation, such similarities are not repeated herein below.

In a basic configuration, one or more sellers 302 (which may be referred to herein in the singular as "seller 302" or in the plural as "sellers 302") may utilize one or more computing devices 304(1)-304(N) (which may be referred to herein in the singular as "computing device 304" or in the plural as "computing devices 304") to access local applications, a web service application 318, a seller account accessible through the web service application, or a web site or any other network-based resources via one or more networks 320 (which may be referred to herein in the singular "network 320" or in the plural "networks 320"). In some aspects, web service application 318, the web site, and/or the seller account may be hosted, managed, and/or otherwise provided by one or more computing resources of the service provider that may implement service 122, such as by utilizing one or more service provider computers 330 (which may be referred to herein in the singular as "service provider computer 330" or in the plural as "service provider computers 330").

Sellers 302 may use the local applications and/or web service application 318 to conduct transactions with the network-based resources of the service provider. These transactions may include, for example, offering artworks for sale. This type of transaction may involve providing descriptive information about artworks to service provider computers 330, such as uploading images of the artworks, and confirming the derived types and attributes. The transactions may also include selling artwork to buyers. This type of transactions may involve exchanging information with service provider computers 330 to complete aspects of the sales.

In some examples, computing devices 304 may also be any type of computing devices such as, but not limited to, a mobile phone, a smart phone, a personal digital assistant (PDA), a laptop computer, a thin-client device, a tablet PC, etc. In one illustrative configuration, computing devices 304 may contain communications connection(s) that allow computing devices 304 to communicate with a stored database, another computing device or server, seller terminals, and/or other devices on networks 320. Computing devices 304 may also include input/output (I/O) device(s) and/or ports, such as for enabling connection with a keyboard, a mouse, a pen, a voice input device, a touch input device, a display, speakers, a printer, etc.

Computing devices 304 may also include at least one or more processing units (or processor device(s)) 312 and one memory 314. Processor device(s) 312 may be implemented as appropriate in hardware, computer-executable instructions, firmware, or combinations thereof. Computer-executable instruction or firmware implementations of processor device(s) 312 may include computer-executable or machine-executable instructions written in any suitable programming language to perform the various functions described.

Memory 314 may store program instructions that are loadable and executable on processor device(s) 312, as well as data generated during the execution of these programs. Depending on the configuration and type of computing devices 304, memory 314 may be volatile (such as random access memory (RAM)) and/or non-volatile (such as read-only memory (ROM), flash memory, etc.). Computing devices 304 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, memory 314 may include multiple different types of memory, such as static random access memory (SRAM), dynamic random access memory (DRAM), or ROM.

Turning to the contents of memory 314 in more detail, the memory may include an operating system (O/S) 316 and the one or more application programs or services for implementing the features disclosed herein including web service application 318. In some examples, computing devices 304 may be in communication with service provider computers 330 via networks 320, or via other network connections. Networks 320 may include any one or a combination of many different types of networks, such as cable networks, the Internet, wireless networks, cellular networks, and other private and/or public networks. While the illustrated example represents sellers 302 and buyers 352 accessing web service application 318 over networks 320, the described techniques may equally apply in instances where the sellers interact with service provider computers 330 via computing devices 304 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, one or more buyers 352 (which may be referred to herein in the singular as "buyer 352" or in the plural as "buyers 352") may utilize one or more computing devices 354(1)-354(N) (which may be referred to herein in the singular as "computing device 354" or in the plural as "computing devices 354") to access local applications, a web service application 368, a buyer account accessible through the web service application, or a web site or any other network-based resources via networks 320. In some aspects, web service application 368, the web site, and/or the user account may be hosted, managed, and/or otherwise provided by service provider computers 330 and may be similar to web service application 318, the web site accessed by computing device 304, and/or the seller account, respectively.

Buyers 352 may use the local applications and/or web service application 368 to conduct transactions with the network-based resources of the service provider. These transactions may include, for example, searching for and purchasing artwork.

In some examples, computing devices 354 may be configured similarly to computing device 304 and may include at least one or more processing units (or processor device(s)) 362 and one memory 364. Processor device(s) 362 may be implemented as appropriate in hardware, computer-executable instructions, firmware, or combinations thereof similarly to processor device(s) 312. Likewise, memory 364 may also be configured similarly to memory 314 and may store program instructions that are loadable and executable on processor device(s) 362, as well as data generated during the execution of these programs. For example, memory 364 may include an operating system (O/S) 366 and the one or more application programs or services for implementing the features disclosed herein including web service application 368.

As described briefly above, web service applications 318 and 368 may allow sellers 302 and buyers 352, respectively, to interact with service provider computers 330 to conduct transactions that involve artwork. Service provider computers 330, perhaps arranged in a cluster of servers or as a server farm, may host web service applications 318 and 368. These servers may be configured to host a web site (or combination of web sites) viewable via computing devices 304 and 354. Other server architectures may also be used to host web service applications 318 and 368. Web service applications 318 and 368 may be capable of handling requests from many sellers 302 and buyers 352, respectively, and serving, in response, various interfaces that can be rendered at computing devices 304 and 354 such as, but not limited to, a web site. Web service applications 318 and 368 can interact with any type of web site that supports interaction, including social networking sites, electronic retailers, informational sites, blog sites, search engine sites, news and entertainment sites, and so forth. As discussed above, the described techniques can similarly be implemented outside of web service applications 318 and 368, such as with other applications running on computing devices 304 and 354, respectively.

Service provider computers 330 may, in some examples, provide network-based resources such as, but not limited to, applications for purchase and/or download, web sites, web hosting, client entities, data storage, data access, management, virtualization, etc. Service provider computers 330 may also be operable to provide web hosting, computer application development, and/or implementation platforms, or combinations of the foregoing to sellers 302 and buyers 352.

Service provider computers 330 may be any type of computing device such as, but not limited to, a mobile phone, a smart phone, a personal digital assistant (PDA), a laptop computer, a desktop computer, a server computer, a thin-client device, a tablet PC, etc. Service provider computers 330 may also contain communications connection(s) that allow service provider computers 330 to communicate with a stored database, other computing devices or server, seller terminals, and/or other devices on network 320. Service provider computers 330 may also include input/output (I/O) device(s) and/or ports, such as for enabling connection with a keyboard, a mouse, a pen, a voice input device, a touch input device, a display, speakers, a printer, etc.

Additionally, in some embodiments, service provider computers 330 may be executed by one more virtual machines implemented in a hosted computing environment. The hosted computing environment may include one or more rapidly provisioned and released network-based resources, which network-based resources may include computing, networking, and/or storage devices. A hosted computing environment may also be referred to as a cloud computing environment. In some examples, service provider computers 330 may be in communication with computing devices 304 and 354 via networks 320, or via other network connections. Service provider computers 330 may include one or more servers, perhaps arranged in a cluster, or as individual servers not associated with one another.

In one illustrative configuration, service provider computers 330 may include at least one or more processing units (or processor devices(s)) 332 and one memory 334. Processor device(s) 332 may be implemented as appropriate in hardware, computer-executable instructions, firmware, or combinations thereof. Computer-executable instruction or firmware implementations of processor device(s) 332 may include computer-executable or machine-executable instructions written in any suitable programming language to perform the various functions described.

Memory 334 may store program instructions that are loadable and executable on processor device(s) 332, as well as data generated during the execution of these programs. Depending on the configuration and type of service provider computers 330, memory 334 may be volatile (such as random access memory (RAM)) and/or non-volatile (such as read-only memory (ROM), flash memory, etc.). Service provider computers 330 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, memory 334 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of memory 334 in more detail, the memory may include an operating system (O/S) 336, an automatic categorization (auto-categorization) module 338, a search module 340, an artwork database 342, a seller database 344, and a buyer database 346. Auto-categorization module 338 and search module 340 may be configured to implement service 122, whereas data generated by this implementation may be stored at artwork database 342, seller database 344, and/or buyer database 346.

For example, auto-categorization module 338 may analyze images of artworks and accordingly generate and store types, attributes, and themes and the corresponding values of artworks at artwork database 340. Also, when sellers 302 confirm the generated data, auto-categorization module 338 may update artwork database 342 accordingly. Similarly, when sellers 302 offer for sale, sell, or remove from sale artworks using service provider computers 330, auto-categorization module 338 may update seller database 344 accordingly. This update may use the seller accounts to track status of the various artworks.

In comparison, search module 340 may allow buyers 352 to browse, find, and purchase artworks. For example, in response to receiving a search from a buyer 352, search module 340 may search artwork database 342 to find artworks that may match the search, may retrieve information about sellers 302 of the found artworks from seller database 344, and may accordingly return search results to buyer 352. Similarly, if a buyer 352 purchases an artwork, search module 340 may update an account of buyer 352 stored at buyer database 348 and may update a corresponding seller account stored at seller database 344. Configurations and operations of auto-categorization module 338 and search module 340, which may be referred to herein as a service module, are further described in greater detail below with reference to at least FIGS. 4-10.

FIGS. 4-10 illustrate example flows and interfaces that can be implemented to obtain and present artwork information as described above in FIGS. 1-3. In the interest of clarity of explanation, service provider computer 330 is described in FIGS. 4-10 as performing the techniques. However, various components of service provider computer 330 may be configured to implement service 122 according to the example flows and interfaces of FIGS. 4-10. These components may include, for example, auto-categorization module 338 and search module 340 for generating data and artwork database 342, seller database 344, and buyer database 346 for storing the data. Nevertheless, other components or combination of components can be used and should be apparent to those skilled in the art. Furthermore, one of ordinary skill in the art will appreciate that computing devices 304 and 354 may perform aspects of the described techniques.

Further, the example flows and interfaces of FIGS. 4-10 may be embodied in, and fully or partially automated by, code modules executed by one or more processor devices of service provider computer 330. The code modules may be stored on any type of non-transitory computer-readable medium or computer storage device, such as hard drives, solid state memory, optical disc and/or other non-transitory medium. The results of the operations may be stored, persistently or otherwise, in any type of non-transitory computer storage such as, e.g., volatile or non-volatile storage. Also, while the flows and interfaces are illustrated in a particular order, it should be understood that no particular order is necessary and that one or more operations or parts of the flows and interfaces may be omitted, skipped, and/or reordered. Additionally, one of ordinary skill in the art will appreciate that computing devices 304 and 354 may perform corresponding operations to provide information to sellers 302 and buyers 352.

Additionally, in the interest of clarity of explanation, in the example flows and interfaces of FIGS. 4-10, server provider computer 330 is illustrated as determining a type and a number of attributes of an artwork. However, server provider computer 330 may similarly determine various hierarchies or levels of information, including sub-types and sub-attributes. For example, for a type of an artwork (e.g., a 2D artwork), server provider computer 330 may determine multiple sub-types (e.g., a painting is a sub-type of a 2D artwork, and a sketch and an oil painting are sub-types of a painting). Similarly, for an attribute of an artwork (e.g., a dominant red color), 330 may determine multiple sub-attributes (e.g., an exact color value of a red-green-blue (RGB) color model and a mapping of an exact color value to a range of colors of the RGB color model are examples of sub-attributes of a dominant red color attribute).

Figure 4:
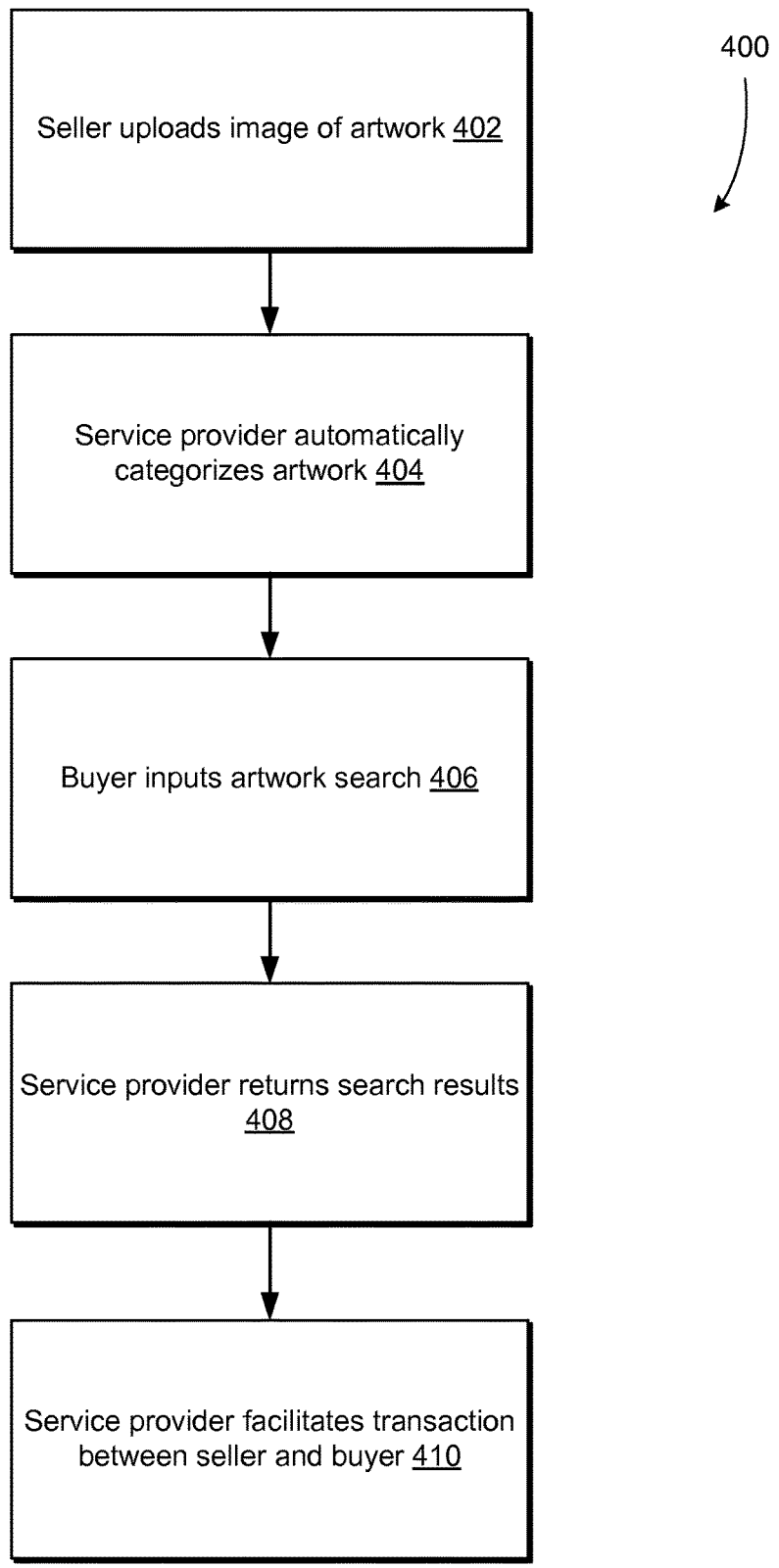
FIG. 4 illustrates an example flow for obtaining and presenting item information to a user, according to embodiments.

Turning to FIG. 4, that figure illustrates an example flow 400 that may be implemented to determine values associated with a type and relevant attributes of an artwork, allow a seller to offer the artwork for sale, and allow a buyer to find and purchase the artwork.

Flow 400 may start at operation 402, where the seller may upload an image of an artwork. At this operation, service provider computer 330 may receive the visual representation of the artwork (e.g., the uploaded image) for analysis.

At operation 404, the service provider may automatically categorize the artwork. At this operation, service provider computer 330 may analyze the visual representation to automatically determine the type of the artwork, and based at least in part on the type, to determine what relevant attributes are required. Based at least in part on the same analysis or an additional analysis of the visual representation, service provider computer 330 may determine values of the required attributes. Also, at this operation, service provider computer 330 may confirm the determined type and attribute values with the seller and may determine combinations of attribute values as suggested themes. Operations 402 and 404 are further described at FIGS. 5 and 6 and an example interface corresponding to the output of these operations is described at FIG. 7.

At operation 406, the buyer may input an artwork search. At this operation, service provider computer 330 may facilitate a buyer search based at least in part on the type, attributes, and/or themes. The artwork search may include a selection of any of these search criteria in addition to or in lieu of keyword searches.

At operation 408, the service provider may return search results to the buyer. At this operation, service provider computer 330 may search attributes, and themes associated with artwork to match the search criteria of the artwork search and may return and present information about found artworks to the buyer. Operations 406 and 408 are further described at FIGS. 8 and 9 and an example interface corresponding to the output of these operations is described at FIG. 10.

At operation 410, the service provider may facilitate a transaction between the seller and the buyer. At this operation, service provider computer 330 may allow the buyer to purchase any of the found artworks and may update a buyer account and a seller account accordingly. This operation may involve, for example, ensuring that the buyer pays the seller for the artwork, ensuring that the seller sends the artwork to the buyer, and receiving feedback regarding the transaction.

Figure 5:
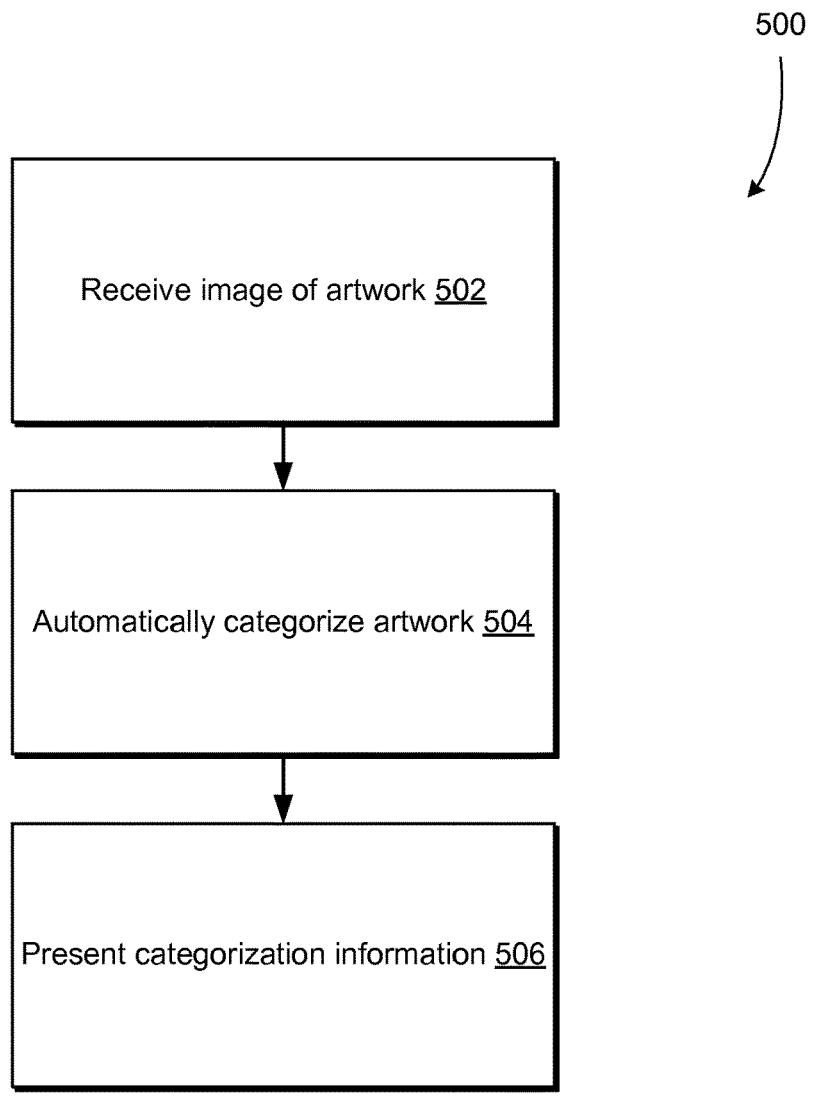
FIG. 5 illustrates an example flow for obtaining item information, according to embodiments.

Turning to FIG. 5, that figures illustrates an example flow 500 that may be implemented to analyze an image of an artwork such that values associated with a type and relevant attributes of the artwork can be automatically determined. Flow 500 may include example implementations of operations 402 and 404 of flow 400. In the interest of clarity of explanation, flow 500 is described as analyzing a single image of a single artwork. However, flow 500 may not be limited as such. More particularly, flow 500 may be implemented to analyze multiple images of a same artwork such that results of each analysis can be cross-checked or such that an analysis one image may supplement results of another analysis. Similarly, flow 500 may also be implemented to analyze multiple images, each of which corresponding to a different artwork. Said differently, flow 500 may allow a seller to upload a batch of images corresponding to multiple artworks, and in return, flow 500 may allow the service provider to automatically analyze these images and return information about each of the corresponding artworks to the seller.

Flow 500 may start at operation 502, where service provider computer 330 may receive an image of an artwork. As explained above, an image is an example of a visual representation. At operation 502, any suitable visual representation can be received from a computing device of a seller.

At operation 504, service provider computer 330 may automatically categorize the artwork. At this operation, service provider computer 330 may analyze the received image to determine a type of the artwork and, based at least in part on the type, may determine a list of relevant attributes that need to be collected for that type of artwork. Service provider computer 330 may also collect values of the relevant attributes based at least in part on the image. At this operation, various analysis techniques may be employed, as further described in FIG. 6. Briefly, these techniques may include various image recognition algorithms to classify the artwork in different types and attributes, such as pixel-by-pixel analysis, edge detection, color mapping, shape overlay, machine learning, optical character recognition (OCR), facial recognition, text recognition, image-to-image comparison, and other image processing techniques.

Figure 6:
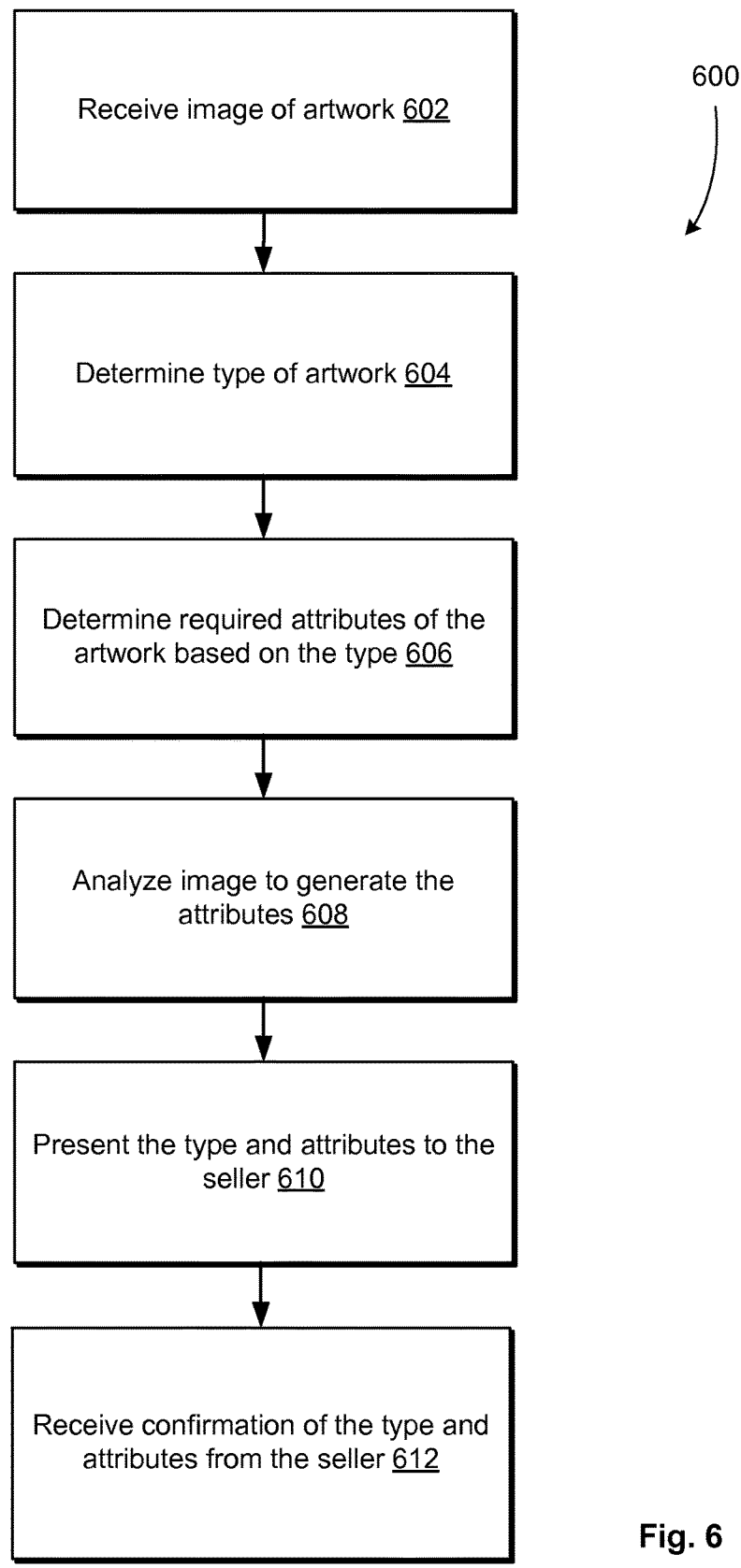
FIG. 6 illustrates an example flow for obtaining and categorizing item information, according to embodiments.
Figure 7:
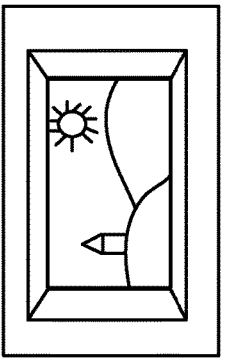
FIG. 7 illustrates an example interface for validating item information, according to embodiments.

At operation 506, service provider computer 330 may present the categorization information. For example, service provider computer 330 may generate an interface that may have fields corresponding to the type and the relevant attributes and may populate these fields with the corresponding values from the image analysis. Also at this operation, service provider computer 330 may provide the seller access to the interface such that the seller can confirm the values. FIG. 6 further describes this operation and FIG. 7 illustrates an example of the interface.

Turning to FIG. 6, that figure illustrates another example flow 600 that may be implemented to analyze an image of an artwork. Flow 600 may include example implementations of operations 502-506 of flow 500. In the interest of clarity of explanation, flow 600 is described as analyzing the image to determine types and attributes of the artwork and subsequently presenting this information to a seller. Nevertheless, flow 600 is not limited as such. More particularly, flow 600 may be configured such that information may be presented to the seller before the analysis is complete. For example, when the type of the artwork is determined, flow 600 may allow service provider computer 330 to present the type to the seller for confirmation before proceeding with the determination of the attributes. Similarly, when values of one or more attributes are determined, flow 600 may allow service provider computer 330 to present these attribute values to the seller for confirmation before proceeding with the determination of remaining attribute values.

Flow 600 may start at operation 602, where service provider computer 330 may receive an image of an artwork from a computing device of a seller. As explained above, various types of artwork may be available and other types of visual representations may also be used. More particularly, the type of the visual representation may depend on the type of artwork. For example, an image may be sufficient to analyze two-dimensional (e.g., a painting), three-dimensional (e.g., a sculpture), or a multi-piece (e.g., a painting that is made of two paintings) artworks. However, an image may not be sufficient to analyze a four-dimensional artwork (e.g., a sculpture that moves, or a sculpture that plays music). In this case, a video or an audio-visual file may be used such that images from the video and, as needed, audio may be analyzed. Alternatively, an image may also be used in this case and, if values of some of the attributes could not be automatically determined, flow 600 may allow service provider computer 330 to request the corresponding information from the seller.

As such, the service provider may apply constraints on acceptable visual representation based at least in part on the type of the artwork to be analyzed. For example, to analyze a four dimensional artwork, the service provider may require the seller to upload an audio-visual file. Similarly, for a complex three dimensional artwork, the visual representation may need to be a three-dimensional CAD file. But for other three dimensional and two dimensional artworks, an image may be sufficient. Also, the constraints may depend on the attributes of the artwork. For example, to analyze a colored artwork, a black and white image may not be used. Instead, the service provider may require a colored and well lit image taken without a flash and not at nighttime. In comparison, for a black and white artwork, a black and white image may be sufficient. In another example, if a painting has a frame, the service provider may request that the seller includes the frame in the image.

Also at operation 602, service provider computer 330 may receive additional information from the seller. In particular, two types of additional information can be received. The first type may include information about the artwork, such as a short description (e.g., in addition to uploading the image, the seller may also specify that "this is a painting of a red barn"), a title (e.g., the seller may specify "this is the Mona Lisa"), an artist (e.g., the seller may specify "this is a Picasso") or other information. Operations of flow 600 may use this type information to seed the analysis of the image. For example, the short description may be parsed to determine the type and/or some of the attribute values, if possible. To illustrate, "this is a painting of a red barn" can be parsed to determine that the artwork may be a painting, that the subject matter includes may include a barn, and that the color palette may include red. This information may be provided as an input and may be used to validate an output of the analysis.

The second type of additional information may include information about the seller, such as an identifier of the seller (e.g., a corresponding account), a price that the seller desires, or a preferred shipping method. Also operations of flow 600 may use this type information to seed the analysis of the image. To illustrate, if the seller account shows that the seller has a history of offering paintings of sceneries from a particular artist, operations of flow 600 may assume that the image of the artwork corresponds to that type of paintings and may validate the assumption based at least in part on the analysis. Similarly, if the price is too low, it may be assumed that a replica rather than an original is associated with the image. If the preferred shipping method is expensive and is associated with a large weight and has special dimensions, it may be assumed that a large sculpture is associated with the image.

At operation 604, service provider computer 330 may determine the type of the artwork. For example, service provider computer 330 may analyze the image received at operation 602 (or any other type of visual representations) and, based at least in part on the analysis, may determine the type. For example, the received image may be compared to images of known artwork. In this example, service provider computer 330 may manage prior knowledge about artwork by, for instance, storing information including images and corresponding types and attributes at a database (e.g., artwork database 342 of FIG. 3). Once the image from the seller is received, service provider computer 330 may perform a comparison to the images from the database. If a match is found, service provider computer 330 may set the corresponding type (and attributes and attribute values as further described below) from the database as the type (and attributes and attribute values) of the artwork in the received image.

In another example, the service provider computer 330 may not have prior knowledge about the artwork. In this case, various techniques may be applied. For instance, as pixel-by-pixel analysis, edge detection, color mapping, shape overlay, machine learning, optical character recognition (OCR), facial recognition, text recognition, and other image recognition techniques may be applied. Also, at this operation, service provider computer 330 may use any additional information as described above to seed and/or validate the analysis.

At operation 606, service provider computer 330 may determine what attributes need to be collected based at least in part on the determined type. Because various types of artwork may have various attributes, at this operation, service provider computer 330 can select a list of required attributes based at least in part on the type of the artwork.

The association between a type of artwork and a list of attributes may be predefined. For example, the service provider may specify what the required attributes for each type of artwork may be. More particularly, an expert of the service provider may determine that certain attributes of a type of artwork may be valuable to buyers while others may not be. As such, the expert may add the valuable attributes to a list and associate the list with the type of artwork. In another example, the association may be determined based at least in part on historical data. More particularly, if the service provider determines that multiple sellers commonly describe a type of artwork by using certain attributes, these attributes may be added to the list.

To illustrate, when the artwork is a painting, the list of attributes may include, for example, a subject matter, a color palette, an orientation, a shape, an artist identifier, a frame condition, a creation date, an age rating, whether the painting is a single or multi-piece artwork, and other attributes. In comparison, when the artwork is a sculpture, the list of attributes may include, for example, a subject matter, a color palette, an installation type, a shape, an artist identifier, a material, a creation date, an age rating, whether the sculpture is a single or multi-piece artwork, and other attributes.

At operation 608, service provider computer 330 may analyze the image received at operation 602 (or any other type of representation) to generate values of the attributes. At this operation, service provider computer 330 may derive the values from the image by using various techniques. These techniques may include, for example, using prior knowledge about the artwork, analyzing the image without such knowledge, or a combination of the two. An example of using prior knowledge is described above and includes service provider computer 330 setting the attributes of the artwork in the image to attributes of matched image from a database.

Examples of analyzing the image without prior knowledge about the artwork include using various image recognition algorithms. Because each type of artwork may have different attributes, the applied algorithms may depend on the type. Also, because attributes may vary for a particular type of artwork, the applied algorithms may depend on the attributes. To illustrate, machine learning, edge detection, and color distribution algorithms may be applied to a color painting of scenery. In comparison, machine learning and facial recognition may be applied to a black and white poster of a celebrity. Also, unlike the case of a color painting, color distribution algorithms may not be applied to a pencil drawing. Or, unlike the case of a black and white poster of a celebrity, text recognition and color distribution algorithms may be applied to a color poster that includes a comical eye exam chart. In an example, the applied algorithms may be the same algorithms applied to determine the type, may continue the analysis from the type, or may apply other techniques.

To determine an orientation, edge detection techniques may be used. For example, brightness of pixels of the image may be measured and sharp changes can be detected and associated with edges of the artwork. This may include, for example, using search-based or zero-crossing based methods. The search-based methods may detect edges by first computing a measure of edge strength, typically a first-order derivative expression such as the gradient magnitude, and then searching for local directional maxima of the gradient magnitude using a computed estimate of the local orientation of the edge, usually the gradient direction. The zero-crossing based methods may search for zero crossings in a second-order derivative expression computed from the image in order to find edges, usually the zero-crossings of the Laplacian or the zero-crossings of a non-linear differential expression. As such, when the edges of the artwork are determined, a length and a width can be determined, measured in a number of pixels, and can be compared. When the length is larger than the width, the orientation may be landscape. Otherwise the orientation may be portrait. Further, results of the edge detection algorithms may not only be used to determine edges of the artwork, but may also be used to determine objects within the artwork. As such, these results may be used to determine the subject matter and other attribute values as further describe below.

To detect a shape, shape recognition techniques may be used. For instance, predefined simple shapes (e.g., rectangle, square, circle, oval, or other shapes) and/or complex shapes (e.g., a shape that may trace a flower, a vase, or other shapes) may be overlaid over the detected edges. Additionally or alternatively, spectral shape analysis may be used and may apply a curve tracing to the detected edges. As such, when a circle fits over the edges of an artwork, the artwork's shape may be recognized as circular. These shape recognition techniques may also be used to recognize shapes of objects within the artwork, which can in turn be used to determine the subject matter and other attribute values.

To detect a color, color distribution algorithms may be applied. This may include, for example, determining for each pixel a color value and mapping the detected color values to a red-green-blue (RGB) color model. This may also include applying a color spectral analysis, such as a Fourier transformation spectroscopy, to determine a color spectrum of the artwork.

The results of applying the color distribution algorithms may be used to determine various color attributes. For example, to determine a predominant color, the average RGB value may be used. In addition, colors mapped to RGB values may be grouped in ranges (e.g., (96, 96, 96) to (224, 224, 224) being a range of a gray color) and thresholds may be used. Any of the mapped colors that may have a distribution greater than a threshold may be declared as an existing color. For example, the service provider may set a threshold of 25%. If an artwork includes 35% violet, 30% green, and 10% orange, service provider computer 330 may determine the violet and green colors but not the orange color as color attributes. Similarly, this mapping may be used to determine color dominance. In this example, service provider computer 330 may determine that violet, green, and orange are the primary, secondary, and tertiary colors, respectively.

The above techniques may be combined to determine further attributes. For example, when the edge detection, shape recognition, and color distribution indicate that a painting mostly include a barn having a red color, service provider computer 330 may determine that the subject matter of the painting is a red barn.

Additional techniques may be further applied. For example, facial recognition may be used to determine whether the artwork not only includes portraits or representations of people, but also includes celebrities or historical figures. Similarly, OCR and text recognition may be applied to determine, for example, a signature and/or a name of the artist of the artwork and other attribute values. For example, if the artwork is a poster of a famous landmark, OCR and text recognition may allow an identification of the landmark (e.g., when the landmark includes identifying text).

Machine learning techniques may also be used. By applying machine learning techniques, service provider computer 330 can further determine attribute values such as subject matter, style (e.g., realism, impressionism), medium (e.g., canvas type, oil-based drawings, pencil-drawing), size, relative scale, and other attribute values. Known attribute values of artworks (e.g., artworks for which service provider computer 330 has prior knowledge) can be used to train the machine learning techniques. As additional artworks are analyzed and corresponding attribute values are confirmed, knowledge about these attributes may be further looped into the machine learning techniques.

An example of using a combination of a prior knowledge and image analysis includes service provider computer 330 applying any of the above described techniques to determine the type and/or some of the attribute values and using the determined information to derive any of the remaining attribute values based at least in part on prior knowledge. In other words, once the type and/or some of the attribute values are known based at least in part on an analysis of the image, further analysis of the image may not be needed to derive remaining unknown attribute values. Instead, service provider computer 330 may use predefined information that correlates attributes and types of artwork. To illustrate, if the analysis of the image indicates that the artwork is a painting of Van Gogh, that information may be sufficient for service provider computer 330 to determine, based at least in part on prior knowledge about paintings of Van Gogh, that the style of the artwork is post-impressionist without further analysis of the image. This prior knowledge and type of correlations may be stored at a database (e.g., artwork database 342 of FIG. 3).

At this operation, service provider computer 330 may also validate the generated attribute values. For example, the validation may include cross-checking the result of the analysis with results of other analyzed images of the same artwork or any additional information received from the seller. Additionally or alternatively, the validation may use images of the artwork from sources other than the seller. For example, once the type and attribute values are generated, service provider computer 330 may perform a comparison to types and attribute values stored at the database of artwork. If matches are found and correspond to a same artwork, service provider computer 330, may declare the generated type and attribute values to be valid. If, however, there are mismatches, service provider computer 330, may declare the mismatched attribute values to be invalid and the matched attribute values to be valid.

Based at least in part on the validation, service provider computer 330 may set a level of confidence for the generated type and for each of the generated attribute values. For example, the service provider may define high, medium, and low levels of confidence using thresholds. In turn, service provider computer 330 may use these thresholds to set the levels of confidence. To illustrate, the thresholds may require any attribute value determined with a likelihood of 95% or higher to be declared as an attribute value of high confidence, any attribute value with a likelihood of 50% or lower to be declared as an attribute value of low confidence, and other attribute values as attribute values of medium confidence. As such, based at least in part on the validation, if service provider computer 330 can determine with high certainty that an attribute value is valid, the corresponding level of confidence would be high. But if the certainty is low, service provider computer 330 may set the level of confidence to low. Otherwise, service provider computer 330 may set the level of confidence to medium. As further described below, service provider computer 330 may use the levels of confidence to present the attribute values to the seller.

At operation 610, service provider computer 330 may present the type, the attributes, and the corresponding values to the seller for confirmation. The presentation may include using an interface such as interface 130 of FIG. 1 or interface 700 as further described in FIG. 7. Service provider computer 330 may configure the interface such that a variety of information may be presented and various actions may be available to the seller.

In an example, service provider computer 330 may present all of the determined type, attributes, and values to the seller and may allow the seller to confirm or update any of this information and to fill-in the blank any missing attribute values (and the type if missing). In another example, service provider computer 330 may use the levels of confidence to tailor the presented information and available actions. For instance, service provider computer 330 may only present attributes that have high confidence levels leaving the remaining attributes blank and may request the seller to fill-in the blank. Alternatively, service provider computer 330 may present all of the attributes and values with an indication of the corresponding levels of confidence. For instance, high level confidence attributes may be highlighted with a green-colored background, medium level confidence attributes with a yellow-colored background, and low level confidence attributes with a red-colored background. Each of the presented levels may also permit certain actions. For instance, the seller may not be able to modify the high level confidence attributes, may be able to update the medium level confidence attributes, and may be required to change or confirm the low level confidence attributes.

At operation 612, service provider computer 330 may receive confirmation of the type and attribute values from the seller. Once received, service provider computer 330 may proceed with listing the artwork for sale. The confirmation may include validations of (e.g., no changes made), updates to, and new information (e.g., filling-in blanks) about the presented type and attribute values. As further illustrated in FIG. 7, service provider computer 330 may configure the interface to accept the confirmation from the seller.

At this operation, service provider computer 330 may also configure the interface to accept suggested themes from the seller. For example, the seller may use the interface to specify that a primary red color attribute, a secondary green color attribute, a tertiary orange color attribute, and a subject matter of an interior room attribute can be grouped together under a Christmas theme. Service provider computer 330 may store this and other received themes for subsequent uses such as to search for the artwork. Similarly, at this operation, service provider computer 330 may allow the seller to define a new attribute and a corresponding value(s). For example, the seller may use the interface to add a new attribute. The new attribute may include any subject similarly to what may be included in a suggested theme but may not necessarily combine attributes. To illustrate, the seller may add a new attribute of "cheerful" to a painting that has a "Christmas" theme. Also, like other attributes, a new attribute may be used in generating a suggested theme.

Further at this operation, service provider computer 330 may track and loop the confirmation received from the seller back into the operations of flow 600. In this way, the fidelity of the applied techniques may be increased based at least in part on knowledge acquired from the confirmation of the seller.

Turning to FIG. 7, that figure illustrates an example interface 700 that may be configured to present results of analyzing an image of an artwork to a seller, including a type, attributes, and corresponding values determined based at least in part on the analysis. More particularly, interface 700 may be an output of operations 602-608 and may be used at operations 610-612 of FIG. 6.

In an example, service provider computer 330 may configure interface 700 to present various information about the analyzed artwork. For example, the analyzed image of the artwork (shown as "your image 702" in FIG. 7) may be displayed to the seller to ensure that the proper artwork was analyzed. Similarly, any determined type (shown as type 712 in FIG. 7) and attributes (shown as attributes 714 in FIG. 7) may be displayed under a category indicating that this information was successfully derived (shown as "here's what we know 710" in FIG. 7). As illustrated, since the values of type 712 and attributes 714 were determined based at least in part on an image analysis, corresponding fields of interface 700 may be pre-populated using the values. Nevertheless, interface 700 may allow the seller to update each of these fields.

Additionally, interface 700 may present fields of relevant attributes that could not be derived based at least in part on the analysis (shown as fields under "tell us more 720" in FIG. 7). The values in these fields may be left blank and may require input from the seller.

Interface 700 may also allow the seller to define suggested themes. As illustrated, interface 700 may present a theme 730 that may have a text field for accepting seller input (e.g., a text input that defines the themes as "Christmas") and various fields for grouping the type and attributes (e.g., checkboxes next to the type and each attribute, such as when checked, the corresponding type and/or attribute values are grouped in the theme).

Further, interface 700 may present other fields (shown as fields 740 in FIG. 7) that allow the seller to provide any additional information. This may include, for example, defining new attributes and corresponding value and other information specific to the artwork and/or the seller such as a seller suggested location for installing the artwork (e.g. a house room), a short description of the artwork, an asking price comments, or any other information.

Once the seller confirms the various values in the fields, interface 700 may allow the seller to submit the confirmation using a submit button 750. Clicking that button may cause the confirmation to be received at service provider computer 330. In turn, service provider computer 330 may proceed with listing the artwork for sale.

Figure 8:
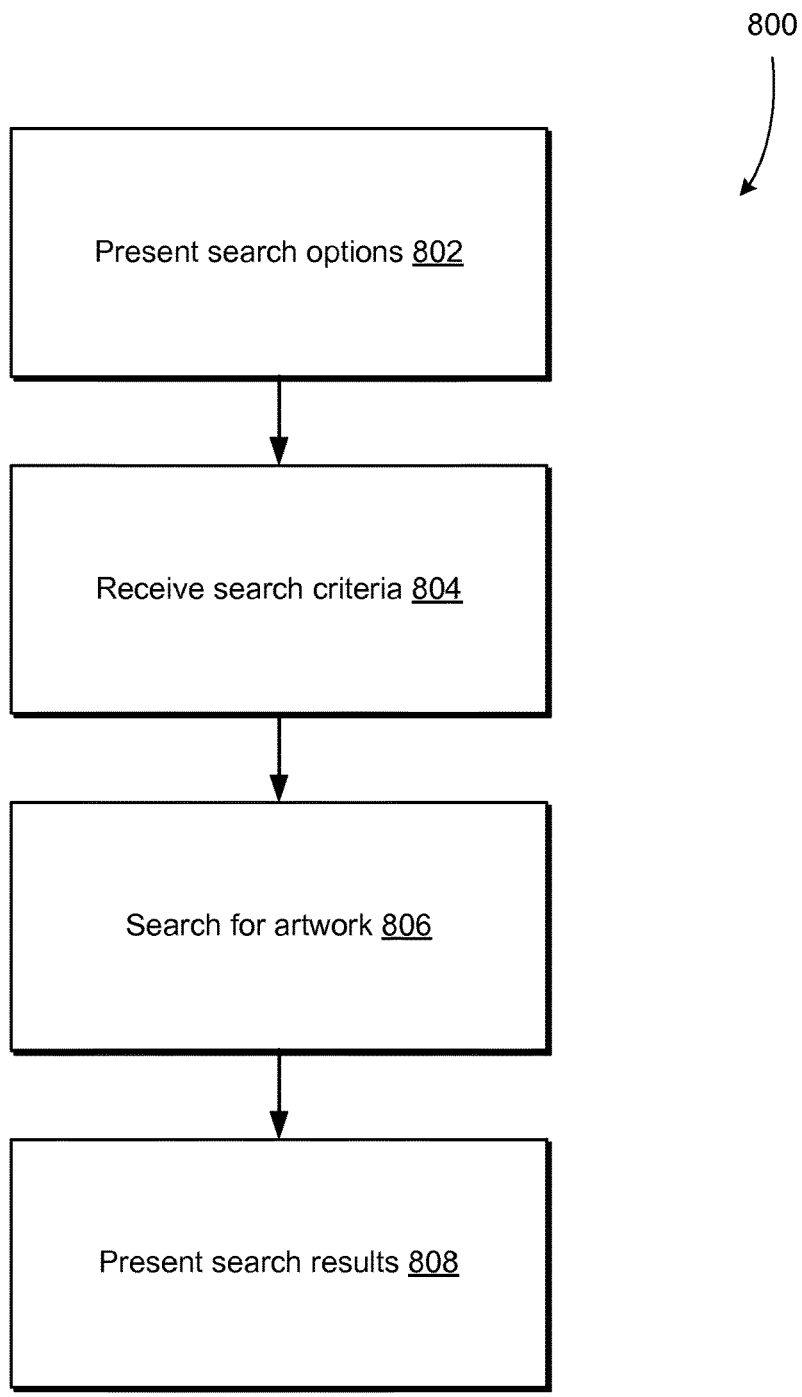
FIG. 8 illustrates an example flow for presenting item information, according to embodiments.
Figure 9:
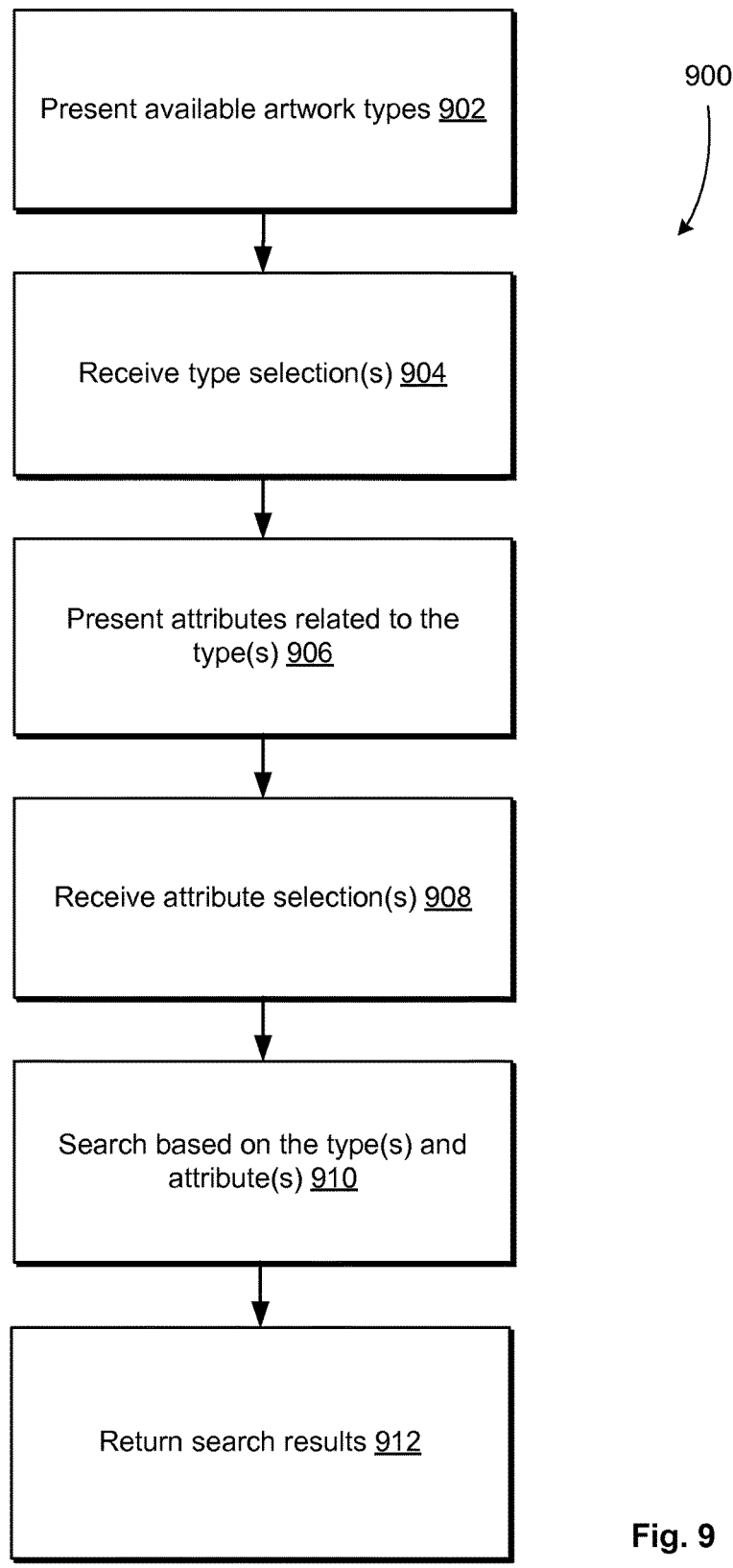
FIG. 9 illustrates another example flow for presenting item information, according to embodiments.
Figure 10:
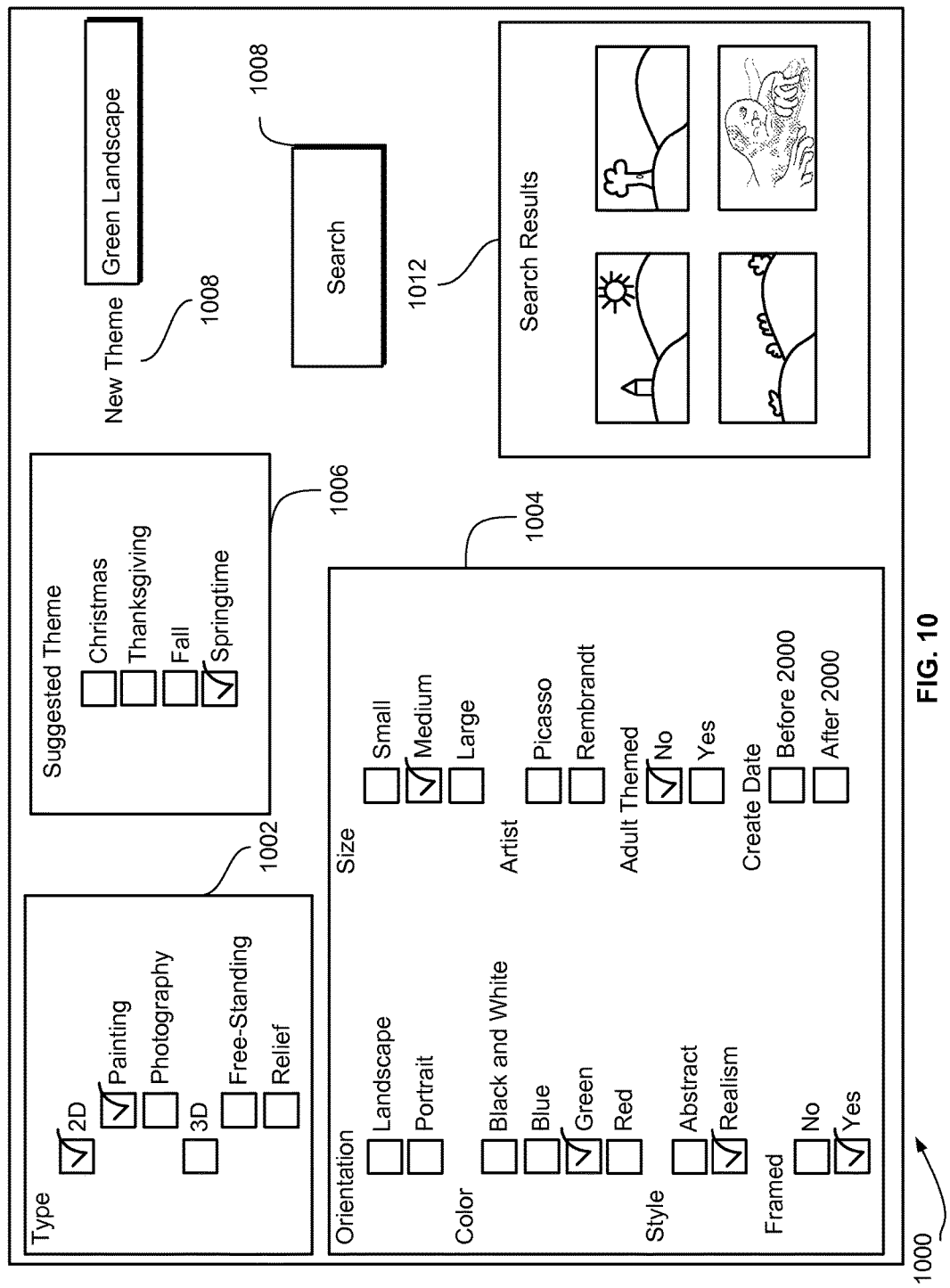
FIG. 10 illustrates an example interface for presenting item information, according to embodiments.

Once an artwork is listed for sale (e.g., at a network-based resource such as a web site hosted by or accessible to service provider computer 330), service provider computer 330 may facilitate browsing and searching for the artwork. Such functionalities can use results (e.g., types, attributes, themes, and corresponding values) of the auto-categorization techniques of FIGS. 6-7. FIGS. 8 and 9 illustrate example flows and FIG. 10 illustrates an example interface available to a user (e.g., a buyer) for providing the browsing and searching functionalities.

Search results presented to the user may depend on the types, attributes, and, optionally themes of the auto-categorized artworks. This dependency may not only include what artworks may be presented in a search result, but may also include relevance of the artworks. To illustrate, two auto-categorized artworks may be paintings that have a subject matter of a house on a prairie. Further, the first painting may have attributes that include a 40% green color and a 40% red color, whereas the second painting may have attributes that include an 80% green color and a 10% yellow color. As such, when a buyer searches for a painting of a house on a prairie, service provider computer 330 may return both paintings in the search result. However, if the buyer specifies that the search is to include a green color, the second painting may be listed in the search result with a higher relevance because of its higher color attribute match (e.g., 80% compared to 40%). Similarly, if the buyer's search criteria include red and green color attributes, the first painting may be listed with a higher relevance because of a higher number of color attribute matches (e.g., red and green compared to only green).

Turning to FIG. 8, that figures illustrates an example flow 800 that may be implemented by service provider computer 330 to present search results to a buyer. Flow 800 may include example implementations of operations 406 and 408 of flow 400. More particularly, flow 800 may start at operation 802, where service provider computer 330 may present search options to a computing device of a buyer. For example, service provider computer 330 may host an interface configured to allow the buyer to search for artworks by entering a keyword search and/or selecting various types and attributes.

At operation 804, service provider computer 330 may receive search criteria from the buyer. This may include, for example, keyword searches and/or a selection of types and attributes. For instance, the buyer may type in a search for "a Christmas painting" at a search field of the interface and may select a number of color attributes from a color wheel or from color swatches presented at the interface.

At operation 806, service provider computer 330 may search for artwork based at least in part on the received criteria. For example, service provider computer 330 may parse the keyword search and/or the selected types and attribute values and search for matches from artwork database 342 of FIG. 3. The matches may be organized based at least in part on a relevance order. For instance, an artwork that may have a larger number of attribute values that match the search criteria may be marked as more relevant than another artwork that has a smaller number of matching attribute values.

At operation 808, service provider computer 330 may present the search results. For example, information about the matched artwork may be displayed at the interface in the relevance order. The artwork information may be retrieved from the artwork database and may include, for each matched artwork, a type, attributes, values, and any additional information (e.g., information about a corresponding seller).

Turning to FIG. 9, that figure illustrates another example flow 900 that may be implemented by service provider computer 330 to provide artwork search results. Flow 900 may include example implementations of operations 802-808 of flow 800.

Flow 900 may start at operation 902, where service provider computer 330 may present available artwork types to a buyer. For example, service provider computer 330 may host an interface accessible to a computing device of the buyer, such as interface 900 of FIG. 9, and may display various types of artwork offered for sale at the interface.

At operation 904, service provider computer 330 may receive a selection of one or more artwork types from the buyer. This may include, for example, the buyer selecting a painting or a sculpture at the interface.

At operation 906, service provider computer 330 may present attributes and corresponding values related to the selected artwork type(s) to the buyer. For example, when a selection for a painting is received at operation 904, service provider computer 330 may present painting-related attributes and values at the interface, such as orientation, color palette, subject matter, and other attributes. Also at operation 906, service provider computer 330 may presented suggested themes at the interface (e.g., a Christmas theme that combines attributes of red, green, and orange colors and a room interior subject matter). These themes may be specified by sellers of artwork, the service provider, or other buyers.

At operation 908, service provider computer 330 may receive a selection of attribute values. This may include, for example, the buyer selecting various attribute values such as values corresponding to orientation, color palette, subject matter, and other attributes at the interface. This may also include receiving a selection of one or more suggested themes. Further at this operation, service provider computer 330 may allow the buyer to define a new suggested theme and/or may track the received selection to subsequently define a new suggested theme. In the first case, service provider computer 330 may, for example, allow the buyer to group and define multiple presented attribute values as a theme at the interface. In the second case, service provider computer 330 may, for example, track what artwork the buyer later purchases, determine a theme for that artwork, and associate the theme with the selected attribute values of operation 908. In both cases, the new suggested theme(s) may be used with subsequent buyers and/or sellers.

At operation 910, service provider computer 330 may search for artworks based at least in part on the selected type and attribute value(s). This may include, for example, looking up artwork database 342 for matches to the selected type and attribute value(s). Also at this operation, service provider computer 330 may use any selected theme(s) to perform the search. For example, artwork database 342 may store associations between suggested themes and artworks usable for this search. Additionally or alternatively, service provider computer 330 may parse types and attribute values from the suggested theme(s) and use these types and attribute values to perform the search.

At operation 912, service provider computer 330 may return search results based at least in part on the search of operation 910. For example, service provider computer 330 may present information about the found artworks at the interface (e.g., artworks with types and attribute values that best match the selections of the buyer). Also at this operation, service provider computer 330 may allow the buyer to perform one or more actions based at least in part on the search results, such as retrieving more information about a specific artwork, purchasing an artwork, or other actions available at the interface.

Turning to FIG. 10, that figure illustrates an example interface 1000 that may be configured to facilitate artwork searches to a buyer. More particularly, interface 1000 may be used at operations 902-912 of FIG. 9.

In an example, service provider computer 330 may configure interface 1000 to present various available search criteria to the buyer, including types 1002, attributes 1004, and suggested themes 1006. Interface 1000 may allow the buyer to select any of the corresponding values. This is shown in FIG. 10 as checkbox selections, although other techniques may also be used. As illustrated in FIG. 10, the buyer may have selected the following search criteria: a two-dimensional painting, a primary green color palette, a realism style, a framed painting, a medium size, a no adult theme, and a springtime suggested theme. In turn, when the buyer selects a search 1008 button displayed at interface 1000, service provider computer 330 may perform a search based at least in part on the selected criteria, and may present search results 1012 at interface 1000. When the buyer selects any of the listed artworks, service provider computer 330 may provide additional information about the selected artwork.

Additionally, interface 1000 may allow the buyer to define new suggested themes. As illustrated, interface 1000 may present a new theme 1008 that may have a text field for accepting input from the buyer (e.g., a text input that defines the new theme as "green landscape"). Service provider computer 330 may associate some of the selected type and attribute values (e.g., a two dimensional painting, a primary green color palette, a realism style, and other attributes) with the input to define the new suggested theme. As such "green landscape" would be available for subsequent buyers and can include two dimensional painting, a primary green color palette, a realism style, and other attributes.

Although interface 1000 is illustrated as including a list of types, attributes, themes and corresponding values, other representations may be used. For example, in lieu of checkboxes, drop-down menus may be used. Other visual representations can be also applied. For instance, a color wheel or color swatches can be used to present selectable color attributes. One having ordinary skill in the art may appreciate that other layouts and representations may be used.

Figure 11:
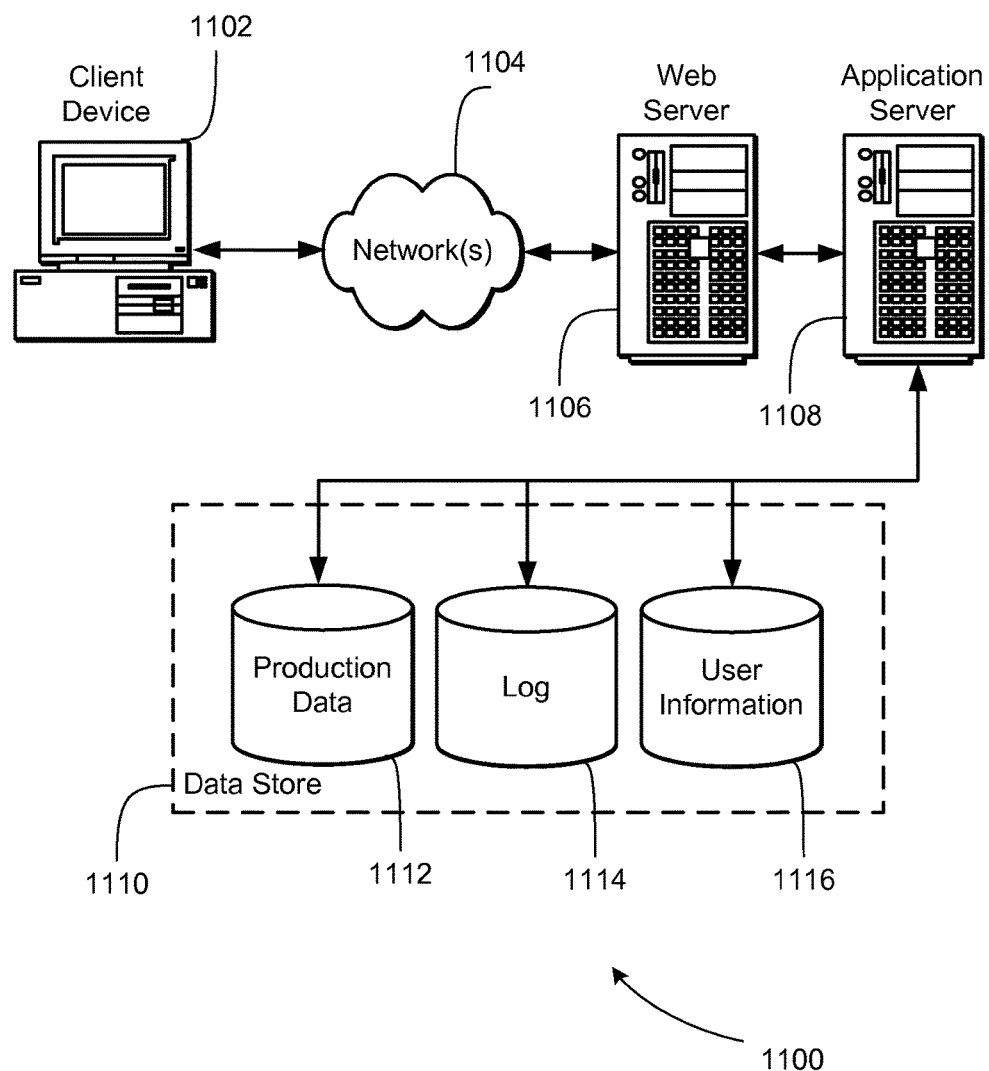
FIG. 11 illustrates an environment in which various embodiments can be implemented.

Turning to FIG. 11, that figure illustrates aspects of an example environment 1100 capable of implementing the above-described structures and functions. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network(s) 1104 and convey information back to a user of the device. Examples of such client devices include personal computers, cell phones, handheld messaging devices, laptop computers, set-top boxes, personal data assistants, electronic book readers, or any other computing device. Network(s) 1104 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between client device 1102 and application server 1108, can be handled by the Web server. It should be understood that the Web and application servers are not required and are merely example components, as structured code discussed herein can be executed on any appropriate device or host machine as discussed elsewhere herein.

Data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in data store 1110. Data store 1110 is operable, through logic associated therewith, to receive instructions from application server 1108 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on client device 1102. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of environment 1100 in FIG. 11 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, by a computer system based at least in part on an interaction between a computing service of a web site hosted on the computer system and a computing device of a provider of artwork, an image of the artwork from the computing device of the provider of the artwork;

in response to receiving the image, the computer system automatically at least:
  determining a type of the artwork based at least in part on a comparison of the image to images of artworks stored in a database, the database associated with the web site;
  determining, from the database, attributes of the artwork based at least in part on the type of the artwork, the database correlating the attributes to the type of the artwork, the attributes comprising a color attribute;
  selecting an image analysis process based at least in part on the type and the attributes;
  determining a first color for the color attribute based at least in part on an application of the image analysis process to the image, wherein the first color is determined by at least:
    determining a color value of a pixel from the image,
    mapping the color value to a color model to generate a mapped color,
    adding the mapped color to a color group that corresponds to a color range, the color range (i) defined based at least in part on the color model and (ii) representing a color,
    determining a distribution of the color group in the image based at least in part on mapped colors of the color group, and
    setting the first color as the color represented by the color range based at least in part on a comparison of the distribution to a threshold;
  determining an object in the artwork and a shape of the object based at least in part on the application of the image analysis process to the image, wherein the object and the shape are determined by at least detecting edges of the object and applying curve tracing to the detected edges;
  setting a theme for the artwork to a predefined theme available from the database and associated with another artwork, the theme set based at least in part on matches between: the first color and a predefined color of the other artwork, the object and a predefined object of the other artwork, and the shape of the object and a predefined shape of the predefined object; and
  providing a first user interface to the computing device of the provider of the artwork, the first user interface provided in a first web page of the web site and presenting a text description of the first color, the object and the theme;
updating, by the computer system, the database by at least storing the first color, the object, the shape of the object, and the theme based at least in part on input received on the first user interface from the computing device of the provider; and
in response to a theme-based search for art from a user device received by a search engine of the web site, providing, by the computer system to the user device, a second user interface in a second web page of the web site, the second user interface presenting the type, the theme, and the image based at least in part on a match by the search engine between the theme-based search and the theme stored in the database.

2. The computer-implemented method of claim 1, wherein the type of the artwork comprises a multi-dimensional artwork.

3. The computer-implemented method of claim 1, wherein the artwork comprises a painting, and wherein the attributes comprise an orientation, a shape, a color palette, a subject matter, a style, an artist, a frame condition, or a creation date of the painting.

4. The computer-implemented method of claim 1, wherein the artwork comprises a sculpture, and wherein the attributes comprise an installation type, a shape, a color palette, a subject matter, a style, an artist, a material, or a creation date of the sculpture.

5. The computer-implemented method of claim 1, further receiving confirmation, from the computing device of the provider of the artwork, of at least one of the attributes, the confirmation received via the first user interface based at least in part on a confirmation option available on the first user interface.

6. The computer-implemented method of claim 5, wherein receiving confirmation of at least one of the attributes comprises:
  receiving information from the computing device of the provider of the artwork, wherein the received information includes a description of another attribute that is not determined by the computer system; and
  updating, by the computer system, at least one of: a second color or the other attribute based at least in part on the received information.

7. The computer-implemented method of claim 1, further comprising:
  wherein the first user interface presents a first field corresponding to the color attribute and populated with the first color, a second field populated with a second color, and a confirmation option selectable by the provider to confirm the second color.

8. The computer-implemented method of claim 1, wherein the image analysis process further comprises a machine learning algorithm trained based at least in part on a plurality of images of artworks.

9. The computer-implemented method of claim 1, wherein the artwork is a color painting or a poster, wherein the image analysis process comprises at least one of:
  a machine learning algorithm, an edge detection algorithm, or a color distribution algorithm based at least in part on the type of the artwork corresponding to the color painting, and
  a machine learning algorithm, or a facial recognition algorithm based at least in part on the type of the artwork corresponding to the poster.

10. The computer-implemented method of claim 1, further comprising:
  determining, by the computer system, that a second color of the artwork is invalid, the second color determined based at least in part on the application of the image analysis process to the image, wherein the first user interface requests an update to the second color based at least in part on the second color being invalid; and
  updating, by the computer system, the database to store the update to the second color, the object, and the shape of the object based at least in part on the input received on the first user interface from the computing device of the provider.

11. A computer-implemented method, comprising:
  receiving, by a computer system configured with executable instructions associated with a network-based resource, an image of a piece of art;
  in response to receiving the image, the computer system automatically at least:
    determining a type of the piece of art based at least in part on a comparison of the image to images of pieces of art stored in a database, the database associated with the network-based resource;

determining, from the database, attributes of the piece of art based at least in part on the type of the piece of art, the database correlating the attributes with the type of the piece of art, the attributes comprising a color attribute;

selecting an image analysis process based at least in part on the type of the piece of art and the attributes;

determining a first color for the color attribute based at least in part on an application of the image analysis process to the image, wherein the first color is determined by at least:

determining a color value of a pixel from the image, mapping the color value to a color model to generate a mapped color, adding the mapped color to a color group that corresponds to a color range, the color range (i) defined based at least in part on the color model and (ii) representing a color, determining a distribution of the color group in the image based at least in part on mapped colors of the color group, and setting the first color as the color represented by the range based at least in part on a comparison of the color distribution to a threshold;

determining an object in the piece of art and a shape of the object based at least in part on the application of the image analysis process to the image, wherein the object and the shape are determined by at least detecting edges of the object and applying curve tracing to the detected edges; and setting a theme for the piece of art to a predefined theme available from the database and associated with another piece of art, the theme set based at least in part on matches between: the first color and a predefined color of the other piece of art, the object and a predefined object of the other piece of art, and the shape of the object and a predefined shape of the predefined object; and providing, by the computer system in a network document of the network-based resource, information about the piece of art to a computing device of a user of an electronic marketplace, the information comprising the type, the first color, the theme, and the image of the piece of art.

12. The computer-implemented method of claim 11, wherein the image is received from the computing device.

13. The computer-implemented method of claim 11, further comprising:

receiving a description of the piece of art from a provider of the piece of art; and updating an attribute of the piece of art based at least in part on the received description.

14. The computer-implemented method of claim 11, further comprising:

instructing the computing device to present a first indication that the first color is valid.

15. The computer-implemented method of claim 14, wherein the first indication is indicative that the computer system does not request input from the user about the first color.

16. The computer-implemented method of claim 11, wherein a second color of the piece of art is determined based at least in part on the theme.

17. The computer-implemented method of claim 16, wherein the attributes further comprise another attribute, and wherein the other attribute is determined based at least in part on the first color and the type of the piece of art.

18. A system, comprising:

at least one memory that stores computer-executable instructions associated with a network-based resource; and at least one processor configured to access the at least one memory, wherein the at least one processor is configured to execute the computer-executable instructions to collectively at least:

receive information about an artwork, the information comprising a visual representation of the artwork;

in response to receiving the information, automatically:

determine, based at least in part on a comparison of the visual representation to another visual representation stored in a database, a type of the artwork, the database associated with the network-based resource;

determine, from the database and based at least in part on the type, a list of attributes of the artwork from the database, the database correlating the attributes with the type of the artwork, the list comprising a color attribute;

select an image analysis process based at least in part on the type of the artwork and the list of attributes;

determine a first color for the color attribute based at least in part on an application of the image analysis process to the visual representation wherein the first color is determined by at least:

determining a color value of a pixel from the visual representation, mapping the color value to a color model to generate a mapped color, adding the mapped color to a color group that corresponds to a color range, the color range (i) defined based at least in part on the color model and (ii) representing a color, determining a distribution of the color group in the visual representation based at least in part on mapped colors of the color group, and setting the first color as the color represented by the range based at least in part on a comparison of the distribution to a threshold;

determine an object in the artwork and a shape of the object based at least in part on the application of the image analysis process to the visual representation, wherein the object and the shape are determined by at least detecting edges of the object and applying curve tracing to the detected edges; and set a theme for the artwork to a predefined theme available from the database and associated with another artwork, the theme set based at least in part on matches between: the first color and a predefined color of the other artwork, the object and a predefined object of the other artwork, and the shape of the object and a predefined shape of the predefined object; and provide, in a network document of the network-based resource, information that comprises the visual representation, the first color, and the theme to a computing device of a user of an electronic marketplace.

19. The system of claim 18, wherein the visual representation of the artwork comprises an image of the artwork, and wherein the type is determined based at least in part on the image.

20. The system of claim 18, wherein the computer-readable instructions further comprise instructions that, when executed by the at least one processor, cause the system to at least:
- determine an attribute from the list of attributes that cannot be extracted from the visual representation; and
- send a request to a user device of another user to select the attribute.

21. The system of claim 18, wherein the computer-readable instructions further comprise instructions that, when executed by the at least one processor, cause the system to at least:
- receive, from the user, information indicative of a confirmation of the theme; and
- in response to a second user searching for art, present a search criteria based at least in part on the confirmation of the theme.

22. One or more non-transitory computer-readable storage media storing computer-executable instructions that, when executed by one or more computer systems, configure the one or more computer systems to perform operations comprising:
- receiving information associated with an artwork, the information comprising a visual representation of the artwork;
- in response to receiving the information, automatically:
  - determining, based at least in part on the received information, a type of the artwork, the type being indicative of a color attribute of the artwork and determined based at least in part on a comparison of the visual representation with another visual representation stored in a database associated with a network-based resource, the database correlating attributes with the type of the piece of artwork;
  - selecting an image analysis process based at least in part on the type of the artwork and the color attribute;
  - determining, based at least in part on an application of the image analysis process to the visual representation of the artwork, first color for the color attribute, wherein the first color is determined by at least:
    - determining a color value of a pixel from the visual representation,
    - mapping the color value to a color model to generate a mapped color,
    - adding the mapped color to a color group that corresponds to a color range, the color range (i) defined based at least in part on the color model and (ii) representing a color,
    - determining a distribution of the color group in the visual representation based at least in part on mapped colors of the color group, and
    - setting the first color as the color represented by the range based at least in part on a comparison of the distribution to a threshold;
  - determining an object in the artwork and a shape of the object based at least in part on the application of the image analysis process to the visual representation, wherein the object and the shape are determined by at least detecting edges of the object and applying curve tracing to the detected edges; and
  - setting a theme for the artwork to a predefined theme available from the database and associated with another artwork, the theme set based at least in part on matches between: the first color and a predefined color of the other artwork, the object and a predefined object of the other artwork, and the shape of the object and a predefined shape of the predefined object; and
- providing, in a network document of the network-based resource to a computing device of a user of an electronic marketplace, information about the type, the color attribute, and the theme of the artwork.

23. The one or more non-transitory computer-readable storage media of claim 22, wherein the providing comprises instructing the computing device of the user to present the information to the user.

24. The one or more non-transitory computer-readable storage media of claim 23, wherein the computer-readable instructions, when executed by the one or more computer systems, further configure the one or more computer systems to perform operations comprising presenting an interface at the computing device, wherein the interface allows the user to search for the artwork based at least in part on at least one of the type of the artwork, the color attribute of the artwork, or the theme of the artwork.

* * * * *